(12) United States Patent
Gebhard et al.

(10) Patent No.: US 7,383,277 B2
(45) Date of Patent: Jun. 3, 2008

(54) MODELING THE LIFE CYCLE OF INDIVIDUAL DATA OBJECTS

(75) Inventors: Gerhard Gebhard, Wiesloch (DE); Harald Weppner, Belmont, CA (US); Rajwinder Singh, Sunnyvale, CA (US)

(73) Assignee: SAP AG, Walldorf (DE)

( * ) Notice: Subject to any disclaimer, the term of this patent is extended or adjusted under 35 U.S.C. 154(b) by 610 days.

(21) Appl. No.: 10/862,124

(22) Filed: Jun. 4, 2004

(65) Prior Publication Data

US 2005/0010504 A1  Jan. 13, 2005

Related U.S. Application Data

(63) Continuation of application No. 10/455,224, filed on Jun. 5, 2003.

(60) Provisional application No. 60/386,547, filed on Jun. 5, 2002.

(51) Int. Cl.
*G06F 17/00* (2006.01)
*G06F 7/00* (2006.01)

(52) U.S. Cl. ............... 707/102; 707/103 R; 707/104.1; 705/22; 705/28; 705/29

(58) Field of Classification Search ............ 707/103 R, 707/104.1, 102; 705/22, 28, 29
See application file for complete search history.

(56) References Cited

U.S. PATENT DOCUMENTS

| | | | |
|---|---|---|---|
| 5,714,917 A | 2/1998 | Ella | 332/144 |
| 6,237,051 B1 | 5/2001 | Collins | 710/36 |
| 6,330,007 B1 | 12/2001 | Isreal et al. | 715/762 |
| 6,349,404 B1 | 2/2002 | Moore et al. | 717/104 |
| 6,560,639 B1 | 5/2003 | Dan et al. | 709/218 |
| 6,650,346 B1* | 11/2003 | Jaeger et al. | 715/764 |
| 6,978,273 B1 | 12/2005 | Bonneau et al. | |
| 7,047,522 B1 | 5/2006 | Dixon et al. | |
| 2002/0186254 A1 | 12/2002 | Monbaron | 715/810 |
| 2002/0188486 A1* | 12/2002 | Gil et al. | 705/7 |
| 2003/0050813 A1* | 3/2003 | Cohen et al. | 705/7 |
| 2003/0195789 A1* | 10/2003 | Yen | 705/9 |
| 2003/0229631 A1 | 12/2003 | Arend et al. | 707/3 |
| 2003/0229646 A1 | 12/2003 | Bach et al. | 707/103 R |
| 2007/0214031 A1* | 9/2007 | Amano | 705/8 |

* cited by examiner

*Primary Examiner*—John Cottingham
*Assistant Examiner*—Susan Rayyan
(74) *Attorney, Agent, or Firm*—Fish & Richardson P.C.

(57) ABSTRACT

A method, as well as a computer program product that implements the method, is provided for user modeling, within a computer system, of a lifecycle of uniquely identified computer data objects that are members of a computer data object family. The method includes receiving a user-defined triggering event occurring in a software application system. The method also includes receiving user-defined permissible states for one or more object attributes that may be present for a uniquely identified computer data object that is a member of the data object family, as well as user-defined permissible transitions between the defined permissible states. The method also includes receiving a user-defined action to be performed on a uniquely identified computer data object that is a member of the computer data object family, when the user-defined triggering event occurs and causes a permissible state transition to occur.

28 Claims, 17 Drawing Sheets

MODELING THE LIFE CYCLE OF INDIVIDUAL DATA OBJECTS

CROSS REFERENCE TO RELATED APPLICATIONS

This application is a continuation (and claims the benefit of priority under 35 U.S.C. §120) of U.S. patent application Ser. No. 10/455,224, filed Jun. 5, 2003, and titled "Individual Data Objects in Enterprise Computing Systems", which claims the benefit of U.S. Provisional Application No. 60/386,547, filed Jun. 5, 2002, and titled "Individual Objects," which applications are incorporated herein by reference in their entireties.

TECHNICAL FIELD

This invention relates to computing master data that are structured as individual data objects wherein each such object uniquely defines a single asset, and also relates to integrating business computing processes with the individual data objects.

BACKGROUND

Customer relationship management (CRM) systems are designed to track relationships between a business and its customers (which may be referred to as a type of business partner), as well as the services or assets (such as software, contracts, or property) that form these relationships. Assets are typically tracked through records representing business partners that have relationships to certain assets. This is the case because CRM systems are designed to focus primarily on customers, or business partners. Additionally, records of these assets are sometimes kept in a tabular format, with a single unique identifier. This makes it difficult, in some cases, to reflect accurately a particular asset's relationships with customers and other products, or its configuration as it differs from other assets of the same family, especially as this information changes with time.

Maintenance of data consistency between different aspects of a comprehensive CRM system (such as aspects of service, marketing, and sales) that relate to the same services or assets can become increasingly complex as additional systems are used for transactions with the same service or asset, especially where different systems use different records to represent the same particular service or asset. Transactions and other events in CRM systems are typically initiated by determining the type of transaction desired. Parameters (such as customer, cost and time) are set, and then a suitable service or asset of the transaction must be found and selected, after which the appropriate modifications must be made to all of the various records that can represent the service or asset.

A shortcoming of CRM and other similar systems is that tracking individual assets can become difficult in industries where assets are high-valued and have long life-spans. In these areas, assets often become increasingly unique with the passage of time. Some CRM systems use product master data for representing assets, wherein a single generic record of master data is used to list all of the components and characteristics of all assets of a particular type. Existing systems are also oriented toward relationships with customers or other business partners, and not towards relationships with assets. Thus, in some cases, it is awkward for such systems to accurately reflect individual assets as they become more and more unique.

Similarly, the meaning of a business transaction is typically fixed by existing CRM applications, and the reuse of master data information, such as material or service "products" a company sells or provides, further limits the ability to customize a transaction to unique situations.

SUMMARY

In one aspect, the invention provides for individual data objects in an enterprise computing system, where the individual data objects represent unique assets of a family of assets. The individual data objects are used in addition to business partner master data, and also in some cases in addition to generic product master data. Thus, the enterprise computing system enables the modeling of business processes centrally around uniquely defined individual objects, while still retaining the advantages of a customer, or business partner, focused system. Such modeling is particularly useful for certain types of assets, such as assets that are highly configurable, have a high value, or have a long and complex lifecycle.

In another aspect, the invention provides a computer system for processing individual data objects. The system has a data repository for individual objects. Each individual object pertains to a unique asset within an asset family, is associated with an object family corresponding to the asset family, and includes, when first created, a unique identifier value, and capable of including additional attributes and attribute values. The computer system also has an executable software module that adds attributes to an individual object based on user input, and that associates an attribute value with each added attribute.

In various implementations, the computer system has one or more of the following features. The object family may identify the attributes that are permitted to be added to each individual object associated with the object family, and the executable software module may only add an attribute to an individual object when the attribute is identified by the object family as a permitted attribute. Each individual object in the data repository may include an attribute value for each attribute of the individual object. The asset that an individual data object represents may be, for example, a tangible or intangible product, or a service.

In another aspect, the invention provides a computer system for processing individual data objects. The computer system has a data repository for individual objects. Each individual object pertains to a unique asset within an asset family, is associated with an object family corresponding to the asset family and includes, when first created, only a unique identifier value, and capable of including additional attributes and attribute values. The computer system also has an executable software module that adds attributes to an individual object in response to a temporal event having an impact on the unique asset to which the individual object pertains, and that associates an attribute value with each added attribute.

In various implementations, the object family may identify the attributes that are permitted to be added to each individual object associated with the object family, and the executable software module only adds an attribute to an individual object when the attribute is identified by the object family as a permitted attribute. Each individual object in the data repository may include an attribute value for each attribute of the individual object.

In another aspect, the invention provides a data repository including individual objects. Each individual object in the repository is associated with an object family and has a unique identifier attribute and attributes that are common with other individual objects that are associated with the same object family to which the object is associated. Each such attribute has a corresponding attribute value.

In various implementations, each individual object in the repository pertains to a unique asset within an asset family. Additional attributes may be added to each individual object in response to a temporal event having an impact on the unique asset to which the individual object pertains, and an attribute value may be associated with each added attribute. The repository may include asset information, information for a product, information for a service, and information for an intangible product. The repository may also include business partner information, with each individual object being capable of being associated with a business partner. Also, each individual object may be capable of 1) including configuration information for the individual object, 2) being associated with history information for the individual object, 3) having location information for the geographical location of the individual object, and/or 4) being associated with calendar information that includes dates and tasks, each task being associated with a particular date.

In another aspect, the invention provides a data repository with product master data, business partner master data, and individual objects. The product master data includes product master records. Each product master record is associated with a particular type of product. The business partner master data includes business partner master records. Each business partner master record is associated with a particular business partner. As for the individual objects, each individual object a) pertains to a unique asset within an asset family, b) is associated with an object family corresponding to the asset family, c) includes, when first created, a unique identifier and attributes, each attribute being associated with an attribute value, and d) is associated with a particular product master record and a particular business partner master record. Additional attributes are added to an individual object in response to a temporal event having impact on the asset to which the individual object pertains, and attribute values are associated with each added attribute.

In another aspect, the invention provides an integration system to integrate a computer system executing a software application with uniquely defined individual data objects. Each individual data object has firstly, attributes, secondly, allowable states for the attributes, and thirdly, allowable transitions between the allowable states. The integration system has an executable software module, wherein, in response to the integration system receiving, from the computer system executing the software application, information that requires an action to be performed on an identified one of the uniquely defined individual data objects, the executable software module produces a corresponding triggering event. The integration system also has data containers. The data containers are, firstly, for importing context data for the raised event, and secondly, for exporting context data returned by the identified individual data object in response to the generated triggering event. The integration system further has an executable event manager software module. This module, firstly, determines, based on the raised triggering event and any imported context data, an action to be performed on the identified individual data object, the event manager using a state manager to determine any transition in the allowable state of the identified individual data object that is required to be made in response to the generated triggering event. Secondly, the event manager software module executes the action, including any required state change, on the identified individual data object.

In various implementations, the individual data objects may represent a configurable item whose configuration changes over the lifecycle of the item. The item may be a product such as an automobile, or a service, for example. The information received from the computer system may explicitly identify the triggering event, or it may do so implicitly. The individual object attributes may include an identifier that uniquely identifies an item corresponding to the particular uniquely defined individual object. The unique identifier may be, for example, a vehicle identification number for an automobile. Possible triggering events include a data request, for example. The integration may further comprise a state manager adapter that interfaces the event manager with the state manager, which may be part of the integration system or alternatively may be in an external system called by the integration system. The state manager may include a state machine engine, and may include a repository of allowable states for individual data objects and a repository of allowable transitions between states. Upon execution of the action on the individual object, a data container may be populated with context data from the identified individual object.

In another aspect, a method is provided for user modeling, within a computer system, of a lifecycle of uniquely identified computer data objects that are members of a computer data object family. The method includes receiving a user-defined triggering event occurring in a software application system. The method also includes receiving user-defined permissible states for one or more object attributes that may be present for a uniquely identified computer data object that is a member of the data object family, as well as user-defined permissible transitions between the defined permissible states. The method also includes receiving a user-defined action to be performed on a uniquely identified computer data object that is a member of the computer data object family, when the user-defined triggering event occurs and causes a permissible state transition to occur.

In various implementations, the modeling method may include one or more of the following features. Each of the uniquely identified computer data objects may correspond to a unique asset belonging to an asset family that corresponds to the computer data object family. In such a case, each of the uniquely identified computer data objects may be an instance of the data object family. The user-defined triggering event may be an event identified and provided by the software application system, or it may be an event determined from information provided by the software application system. In the latter case, the method may further include receiving an identification of context information provided by the software application system from which context data the triggering event is determined.

Other variations include a method where at least one of the user-defined states has an exit action associated therewith that is executed when a state transition occurs from that state, and/or an entry action associated therewith that is executed when a state transition occurs to that state. At least one of the user-defined state transitions has an action associated therewith that is executed when that state transitions occurs. The user-defined action may be the creation of a computer history record that documents the event triggering the user-defined action, or the storing of a new attribute value for a specified attribute of a uniquely identified computer data object that is a member of the computer data object family, to name a few examples. The modeling method may also include storing the user-defined triggering event, permissible states, permissible state transitions, and action in a computer system that interacts with a repository of the uniquely identified computer data objects.

In another aspect, a computer program product is provided that comprises program instructions that when executed enable a computer system to perform the above-described methods for user modeling of a lifecycle of uniquely identified computer data objects that are members of a computer data object family.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
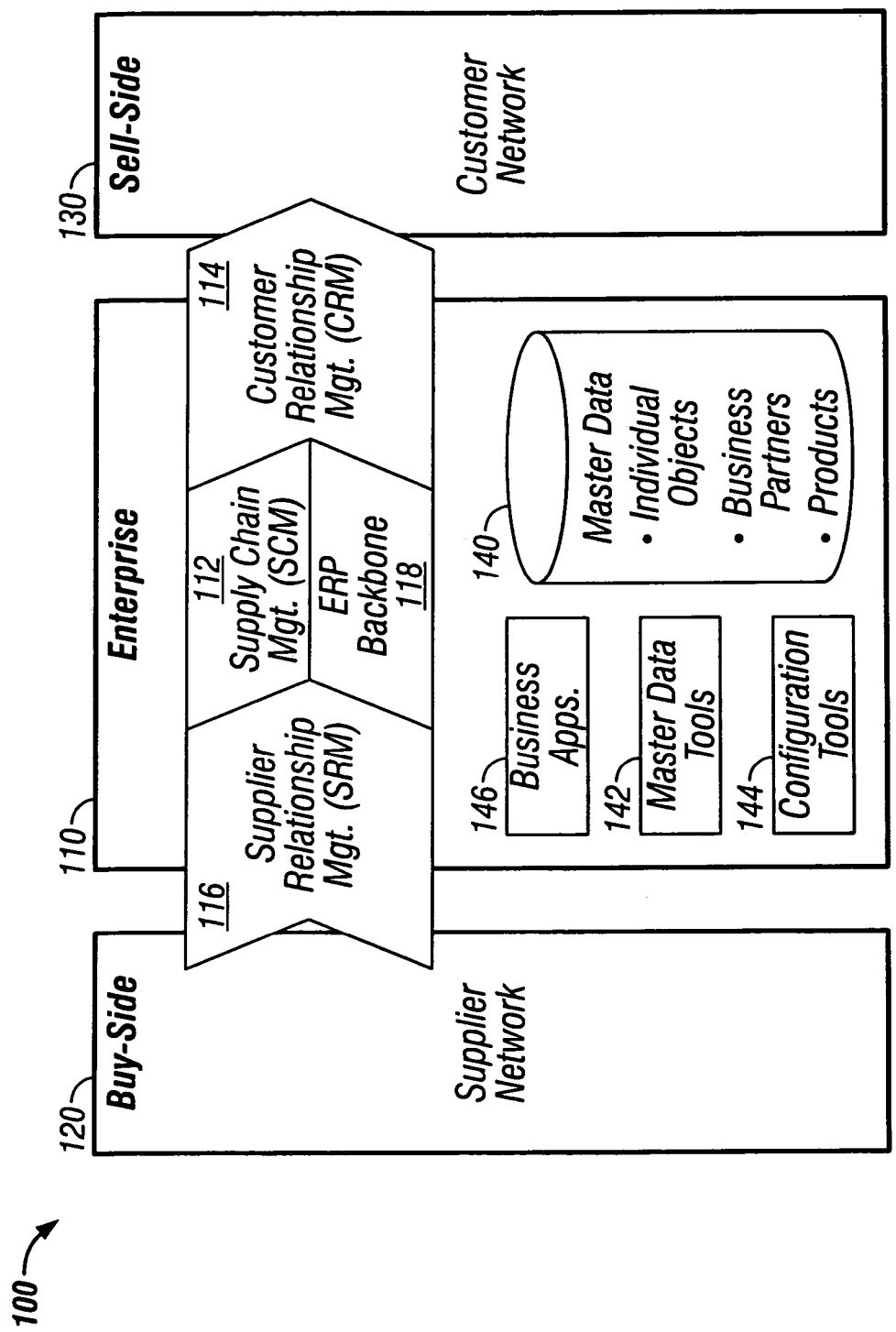
FIG. 1 is a block diagram of an integrated group of systems that make use of individual data objects in accordance with the invention.

An integrated group of systems 100, shown in FIG. 1, makes use of individual data objects in accordance with the invention. The group of systems 100 includes an enterprise computing system 110, which is networked with a supplier network 120 (on a buy-side), and also with a customer network 130 (on a sell-side).

In this example, the enterprise system 110 includes a supply chain management (SCM) solution 112 that links purchasing-related processes with the business procedures of suppliers. A customer relationship management (CRM) solution 114 guarantees sales-related links with customers, and a supplier relationship management (SRM) solution 116 guarantees supply-related links with suppliers. The association between the two external systems 120 and 130 is enabled by a common enterprise resource planning (ERP) system 118.

In the enterprise system 110, master data is stored centrally in a data repository 140. The master data, in this example, includes individual data object information, business partner information, and product information. Master data tools 142 are used, for example, to create and maintain the master data. Configuration tools 144 may also be used to structure the master data. A wide array of business applications 146 make use of the centrally stored master data.

An individual data object, or simply individual object, represents a globally unique tangible or intangible product. By way of example, individual objects represent the products that a company sells, or for which the company provides a service. The following are examples of assets that an individual data object may represent: 1) a computer monitor with a manufacturer's serial number "123xyz;" 2) Mr. Smith's washing machine at 109 Fell Street in San Francisco (although the washing machine does not have a uniquely identifying number, it would be practically impossible to confuse it with another washing machine); 3) a life insurance policy identified by a policy number; 4) a building with an address; and 5) an automobile with vehicle identification number "XV128347AC19327." Each individual object belongs to an object family that corresponds to a family of assets to which the unique asset belongs. Examples of object, or asset, families include, for example, household appliances, software licenses, and so on. Establishing an object family for an individual object may establish which fields, or attributes, are maintained with the individual object.

The data structure of an individual object may have a very small kernel. The kernel includes, for example, a unique identifier for the individual object and, in some cases, attributes stored as part of the individual object. Data fields (or attributes) and groups of fields which are needed by the individual objects may be created, and then those fields and groups of fields may be linked to the kernel. As such, the individual object need not have a fixed set of fields that may never be used, and thus would waste data storage.

The attributes of an individual object may include information about the asset corresponding to the individual object. Examples of such attributes include technical data, configuration information, counters, wage information, and documents. An individual object may also have relations to business partners (persons or organizations). These relationships may be time dependent. For example, a person with an ownership relationship to an individual object may not have that relationship over the entire lifecycle of the individual object. An individual object may also have attribute information identifying a location of the asset corresponding to the object (that is, geographical data). Examples of location data include a site where a piece of equipment (the unique asset) is installed, a geographical location where a mobile asset (e.g., a taxi) is currently located. In the latter example, the taxi may have global positioning system (GPS) capability and the ability to transmit that information to a receiver interconnected with a computing system interconnected with the taxi's individual data object; as such, a taxi dispatcher may use the individual data object structure to locate a taxi nearest to a particular location. The individual object may also have an object calendar with dates and tasks.

The use of individual object master data is especially useful in industries where products are high valued or have a long life span, in which cases each product may become increasingly unique throughout its lifecycle. In addition, some types of products are becoming more and more configurable, resulting in an increase in product options, and thus unique products. In these scenarios, the use of individual object data is especially useful in that a central reference for transactions between a company and its business partners may be the individual object. It is possible, as is described in more detail later, to perform business transactions on the individual objects. In a CRM system, for example, this may include various sales, marketing and service transactions. For example, individual objects may be embedded in sales processes, service processes, marketing processes, or in processes for getting information from customer interaction, or call center, applications. In another example, individual objects may be used in marketing applications that determine a target group of customers or potential customers toward which to direct a marketing campaign. In this example, the customers may be identified by virtue of a relationship they have to certain individual objects, or that they have to certain individual objects with certain attributes.

Business partner master data represent persons or entities with which the enterprise partners in a business relationship. By way of example, a business partner may be a supplier, a customer (or potential customer), an employee (of the enterprise, a supplier or a customer), or any other person or entity. The information about a business partner included in the business partner master data may include, for example, address information, contact persons, relationships between different business partners, and credit, payment and delivery information.

Product master data provides information on products that a company purchases and sells. In comparison to individual object master data, product master data relates to a product, whereas individual object master data relates to a specific unique one of the product. By way of example, a product may be a specific model of refrigerator, and an individual object may be a specific refrigerator with a unique serial number. The product master data products can be tangible (such as a personal computer) or intangible (such as services like personal computer maintenance). Product-specific data may be stored in specific product master records. Each product master record ideally contains the data required to manage the product. This data can be divided into 1) data of a descriptive nature such as size and weight; and 2) data with a control function, such as an item category group for determining each item in a purchase order.

Figure 2A:
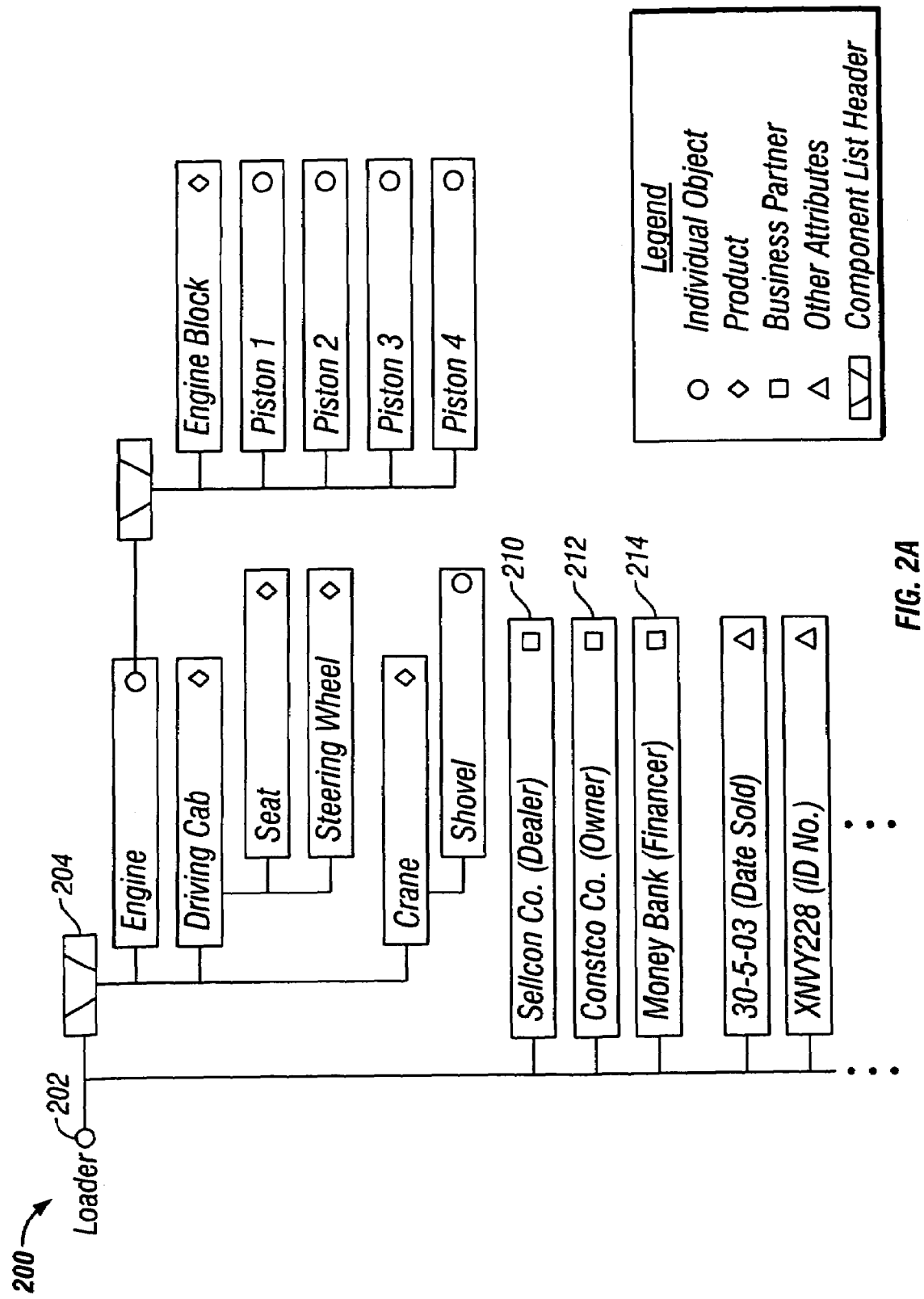
FIG. 2A is a diagram illustrating a data structure of an example individual data object.

FIG. 2A shows the data structure 200 of an example individual data object. In this example, the individual object is a wheel loader, which is a construction machine. The loader is modeled as an individual object, as indicated by the circle 202. Individual objects, such as the object 200 shown in FIG. 2, may have three different types of attributes: 1) component lists; 2) business partners (and their relationship to the object); and 3) descriptive attributes (and their values). All three of these attribute types are shown in the example shown in FIG. 2. Also, there may be a history of attribute values that may be archived for each of these attributes in a history record for the individual object.

In FIG. 2A, a component list has a header 204, with components listed hierarchically under the header 204. The component list may be modeled, for example, by a configuration management tool or an installed base tool. The modeled component list object may then be linked to the individual object, as depicted in FIG. 2 by the line between the header 204 and the individual object 202. In this example, the main components of the loader are an engine, a driving cab, and a crane. The engine itself is an individual object, and the driving cab and crane are products (because, for example, these components may not be tracked individually as individual objects). The engine has a linked component list, which includes an engine block (a product object) and four uniquely identified pistons (individual objects). The driving cab includes a seat and a steering wheel (both product objects), and the crane includes a shovel (an individual object).

In the FIG. 2A example, three business partners 210, 212 and 214—indicated by the symbol of a square—are linked to the loader individual object 202, and the role of each business partner with respect to the individual object 202 is also identified. The dealer who sold the loader is the business partner SellCon Company, the owner of the loader is the business partner ConstCo Company, and the financer is the business partner Money Bank. Next, two additional descriptive attributes—indicated in the figure by triangles—are linked to the individual object 202: 1) a "date sold" attribute having a value of 30 May 2003; and 2) an "identification number" attribute having a value of XNVY228.

Figure 2B:
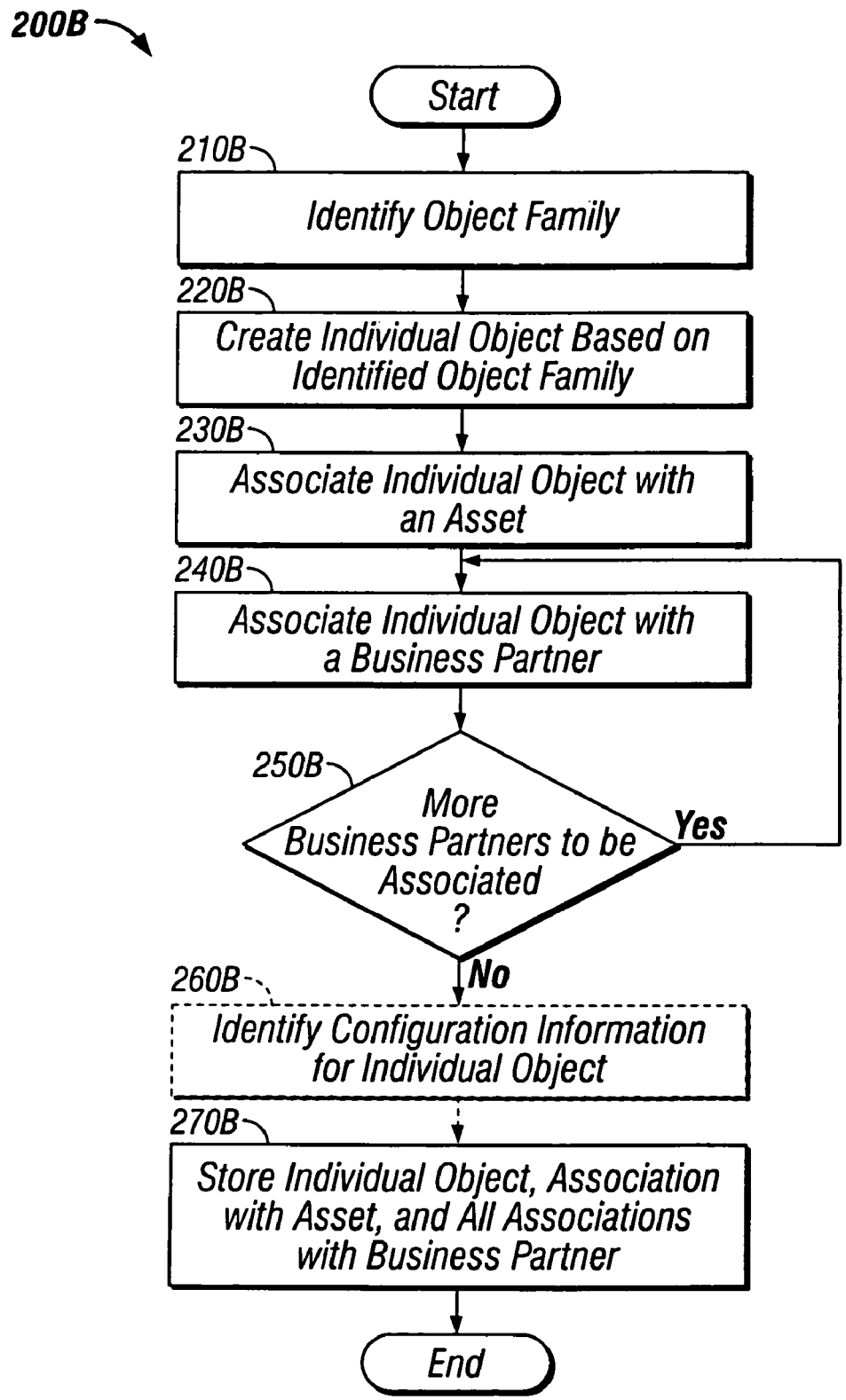
FIG. 2B is a flow chart depicting a process for creating an individual data object.

FIG. 2B depicts a process 200B for creating an individual object that represents a globally unique tangible or intangible product. The process 200B may be performed by a person using a computer system, such as the computer system described in FIG. 14. The process 200B begins with a user identifying the object family to which the individual object belongs (step 210B).

The computer system then creates the individual object based on the identified object family (step 220B). This may be accomplished, for example, by the computer system accessing a template for generating an individual object belonging to a particular object family. The template may identify the attributes that may be included by each individual object that belongs to the particular object family. The attributes may be referred to as the permissible attributes for the object family. The template also may identify, from the permissible attributes, the attributes that are to be added to an individual object when an individual object belonging to the object family is created. The computer system then may use the accessed template to generate the particular individual object. The user may indicate the attribute values by keying the attribute values into the computer system, or the attribute values may be identified by a computer program (such as when default attribute values are used for any individual object belonging to the particular object family when the individual object is first created).

The individual object is associated with an asset (step 230B). The associated asset may identify the family of assets to which the unique asset represented by the individual object belongs. This may be accomplished, for example, by the user identifying particular product master data that represents the asset to which the individual object pertains. The computer system then may associate the product master data with the individual object, for example, by associating a unique identifier for the product master data with the individual object.

The individual object is associated with a business partner (step 240B). For example, this may be accomplished by the user identifying a particular business partner that represents a business partner related to the individual object. The computer system then may associate the business partner with the individual object, for example, by associating a unique identifier for the business partner with the individual object. The user also may associate a time period with the association between the business partner and the individual object. The user may continue associating additional business partners with the individual object until no more business partners need to be associated with the individual object (step 250B).

The ability to associate more than one business partner with an individual object may be useful for representing the individual object as a software object that corresponds to a real world object. Many different people and business entities may be related to a real-world object, such as an automobile. A particular automobile typically is related to an owner, a manufacturer, a dealer, and an insurance company.

Therefore, the ability to relate more than one business partner to an individual object that corresponds to a real-world automobile may be useful. Additionally, over the course of the life time of an automobile, the automobile may have different owners. The ability to identify the time period during which the business partner had a relationship with the individual object also may be useful.

In some implementations, configuration information for the individual object may be identified (step 260B). A user may identify configuration information, such as the language to be used by the user interface when displaying the individual object or other types of control data, including user configuration options or system configuration options that relate to the individual object. A computer program also may be used to identify configuration information, such as by accessing configuration information stored for a CRM system.

The computer system then stores the individual object, the association of the individual object with an asset, and the association of the individual object with a business partner or business partners (step 270B). The process 200B ends.

In some implementations, an individual object may be associated with an asset based on the identification of the object family. In such a case, the association of the individual object with an asset (step 230B) may be performed implicitly. Byway of example, an individual object for the object family "vehicle" is created by a computer system in which product master data exists for a "vehicle." In such a case, the individual object created in step 220B includes an implicit association with the asset vehicle based on the association of the product master data for "vehicle" with the object family "vehicle." The association of the product master data with the object family may be based, for example, on the use of a product master data identifier that also identifies the object family to which the individual object belongs.

Figure 2C:
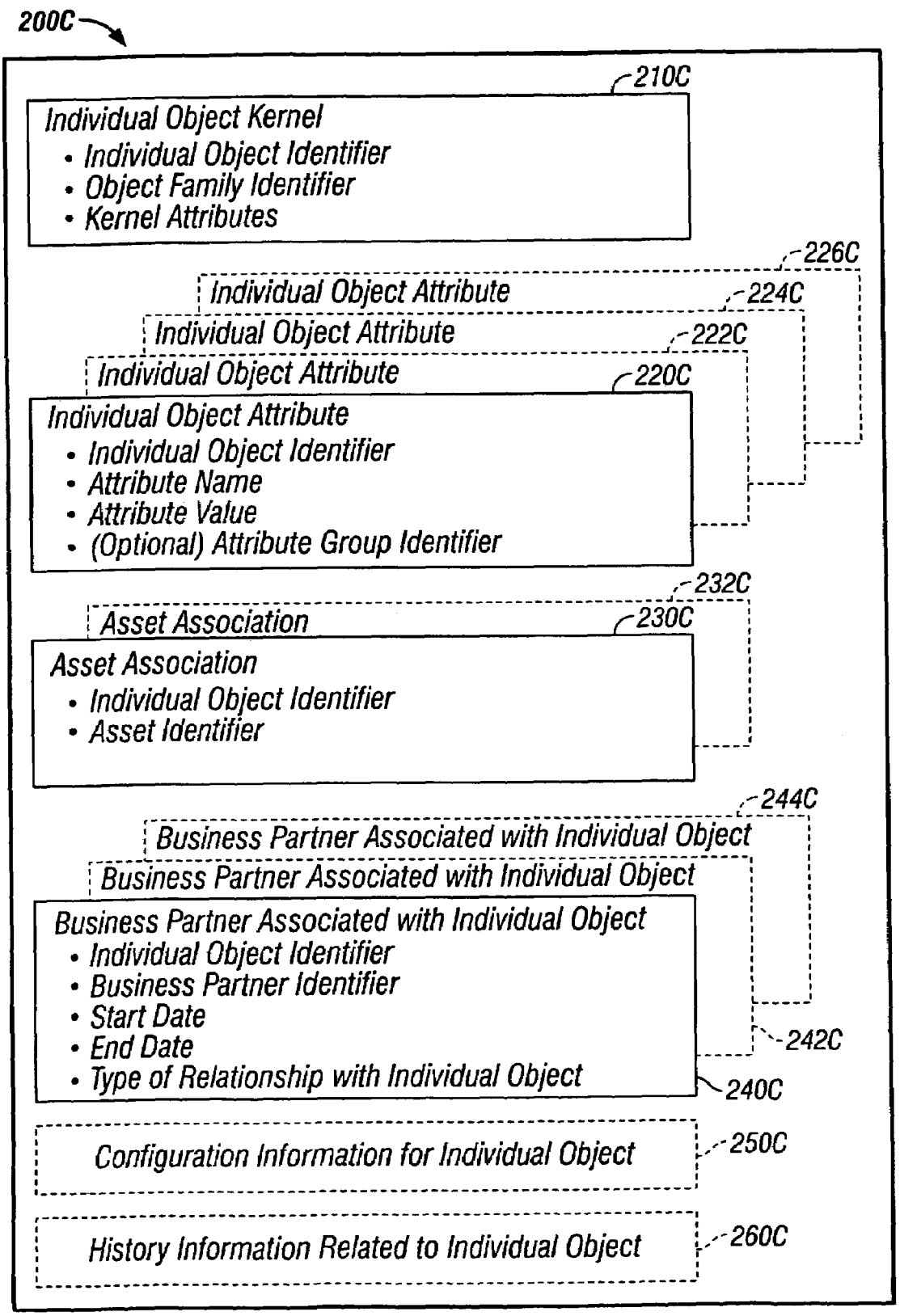
FIG. 2C is a diagram showing a data structure of another example individual data object.

FIG. 2C shows the data structure 200C of another example individual object. The data structure 200C illustrates a multiple component data structure for an individual object. Each component for the individual object data structure 200C may be represented by a record in a data management system. The types of records used in data structure 200C include an individual object kernel 210C, an individual object attribute record 220C, an asset association record 230C that represents the asset or an asset family represented by the individual object, and a business partner association record 240C that represents a business partner that has a relationship to the individual object.

The individual object kernel 210C represents the essential or core elements of the individual object. The individual object kernel 210C includes an individual object identifier that uniquely identifies the individual object to which the individual object kernel 210C applies. The individual object identifier may be a globally unique identifier that is produced from a well-known algorithm and is able to be processed by any computer system using the well-known algorithm. The individual object identifier also may be a unique identifier generated using a proprietary key numbering system, such as one in which primary keys are created by sequentially allocating numbers within an allocated number range. In some implementations, a individual object may include more than one type of individual object identifier. This may be useful, for example, when the individual object is used by computer systems that use different types of keys to identify the individual object.

The individual object kernel 210C also includes an object family identifier that identifies the object family to which the individual object belongs. The individual object kernel 210C includes kernel attributes of the attribute values for the attributes that are essential for the individual object. Typically, the kernel attributes represent a very small number of attributes. In some implementations, when an individual object does not include any essential attributes that always apply to an individual object, an individual object kernel 210C may not include a kernel attribute.

The individual object attribute record 220C represents an attribute value for the individual object identified by the individual object identifier. As such, the individual object attribute record 220C includes the individual object identifier for the individual object (and hence, the individual object kernel 210C) to which the attribute value of the individual object attribute 220 applies. The individual object attribute record 220C also includes the attribute name and the attribute value applicable to the named attribute. In some implementations, attributes that are related may be organized as a group of attributes. In such a case, an identifier for a particular attribute group, to which the attribute of the individual object attribute record 220C belongs, also may be included in the individual object attribute record 220C. Multiple attribute records may exist for an individual object, as shown by individual object attribute records 222C-226C.

The asset association record 230C includes an individual object identifier and an asset identifier that identifies a particular individual object and the asset represented by the particular individual object. For example, the asset identifier may identify a product master record for the asset to which the individual object applies. An asset identifier also may be used to identify records for other types of assets, such as a service or an intangible product. In the data structure 200C, an individual object may have multiple asset association records, as shown by asset association record 232C. The ability to associate multiple assets with an individual object may be useful when an individual object is an individual object that includes multiple assets. For example, referring again to FIG. 2A, the loader and the engine may be modeled as an individual object that includes a loader asset and an engine asset rather than being modeled as two individual objects (as in FIG. 2A).

The business partner association record 240C includes an individual object identifier and a business partner identifier that identifies a particular individual object and a business partner that has a relationship to the particular individual object. For example, the business partner identifier may identify a business partner record. The business partner association record 240C also includes a start date and an end date that identify the period during which the identified business partner was related to the individual object. For a relationship that is ongoing with the individual object, the end date may be blank, set to a value that identifies the relationship as ongoing (such as setting the end date to date far in the future, for example, "Jan. 1, 2222"), set to a date on which the relationship is to expire or otherwise terminate, or otherwise indicating an ongoing relationship. The business partner association record 240C also identifies the type of relationship that the business partner has with the individual object. Examples of relationship types include owner, dealer, manufacturer and insurer for an individual object representing an automobile. Other examples of relationship types include customer, supplier and employee. An individual object may have more than one business partner association record, as shown by business partner association records 242C-244C.

The data structure 200C also may include configuration information 250C for an individual object. For example, configuration information 250C may include an individual object to identify a particular individual object to which the configuration information applies. In one example, configuration information 250C includes the language to be used for the user interface to display, use or modify the individual object.

The data structure 200C also may include history information 260C for an individual object. History information for an attribute or an association for the individual object may be included. In one example, history information may identify the particular user that added a particular attribute value and the date on which the attribute value was added. In another example, history information may identify a business partner that formerly was related to the individual object. In the example of an individual object for a particular automobile, the history information may include a former owner of the automobile or a former insurer for the automobile.

As depicted, the data structure 200C for an individual object has an individual object kernel that includes only essential elements of the individual object and is extensible to allow for additional attributes and associations to be included to the individual object as additional attribute values and associations are identified for the individual object. As such, the individual object represented by data structure 200C need not have a fixed set of attributes that may never be used, and thus would not waste data storage. In some implementations, the data management system used to store master data may use a null value as an attribute value to indicate that an attribute value for a particular attribute has not yet been defined or otherwise used. For example, a relational database management system may use a null value, which may be represented by a particular ASCII code, to indicate that an attribute value is not yet associated with an attribute. In such a case, the null value is a data management system artifact and is not considered to be an attribute value for the individual object.

Other software engineering and data management techniques may be used to represent individual object data structures. In one example, the kernel attributes may be stored as individual object attributes, such as individual object attribute records 220C-226C, rather than being stored as attributes in the individual object kernel 210C. In another example, when only one asset is associated with the individual object and the asset is identifiable through the object family identifier in the individual object kernel 210C, the asset association record 230C may not be needed in the data structure 210C, as described previously in FIG. 2B. In yet another example, an individual object attribute record 220C may include an attribute identifier (rather than an attribute name) to identify a particular attribute to which the attribute value applies. All of the attribute names and values that apply to a particular group of attribute values may be included in a group attribute record for a particular individual object (rather than including multiple individual object attribute records, all of which apply to the same group of attributes). In such a case, more than one attribute group record (with each attribute group record holding the attribute names and values for a particular attribute group) may exist for each individual object.

Figure 2D:
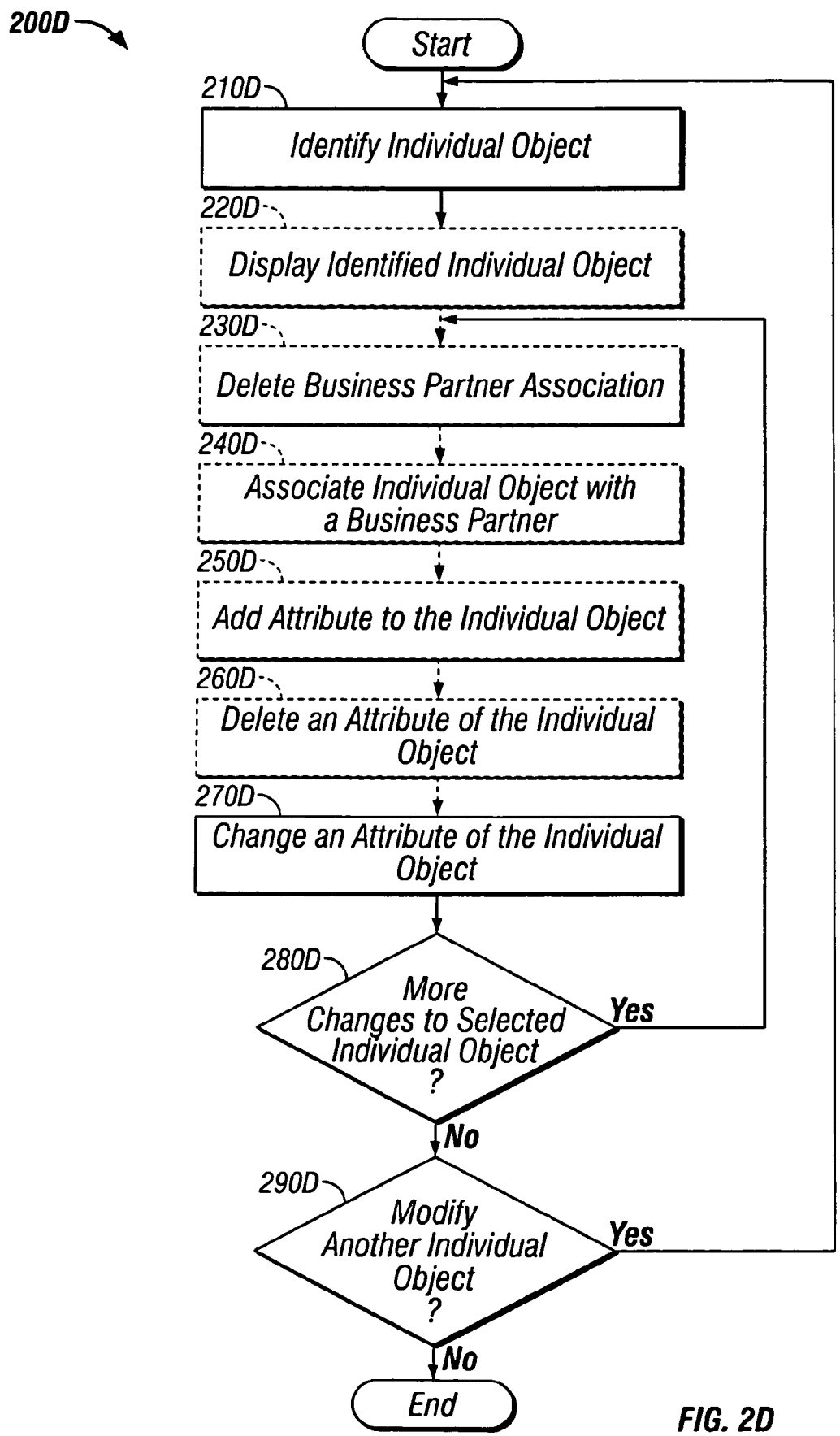
FIG. 2D is a flow chart illustrating a process for modifying an individual data object.

FIG. 2D shows a process 200D for modifying an individual object having a data structure 200C. The process 200D may be performed by a person using a computer system, such as the computer system described in FIG. 14.

The process 200D begins with a user identifying an individual object to be modified (step 210D). In one example, the computer system presents a list of individual objects from which the user selects the individual object to be modified. In another example, the user may identify the individual object to be modified by keying, into the computer system, the individual object unique identifier that corresponds to the individual object.

The computer system accesses and displays the identified individual object (step 220D). For example, the computer system may display information stored in the individual object kernel 210C, the individual object attribute records 220C-226C, the asset master data identified by the asset association records 230C-232C, and the business partner master data identified by the business partner association records 240C-244C.

The user may delete a particular business partner association (step 230D). This may be accomplished, for example, when the user selects a button associated with one of the displayed business partner master records. The computer system deletes the business partner association record that corresponds to the selected business partner master record. The computer system does not delete the business partner master record itself.

The user may add a new business partner association record by associating the individual object with a business partner (step 240D). This may be accomplished, for example, as described previously in FIG. 2B.

The user may add a new attribute to the individual object (step 250D). In one example, the computer system may present a list of permissible attributes for the individual object based on the object family to which the individual object belongs. The user may select one of the displayed permissible attributes and key a value to be associated with the selected attribute. The computer system then creates an individual object attribute record, such as one of the individual object attribute records 220C-226C in FIG. 2C. The created individual object attribute record identifies the individual object identifier of the individual object being modified, the attribute name of the attribute selected, and the attribute value keyed by the user.

The user may delete an attribute of the individual object (step 260D). The deletion of an attribute may be accomplished, for example, when the user selects a button associated with a displayed attribute of the individual object. The computer system deletes the individual object attribute record that corresponds to the selected individual object attribute. In some implementations, the user may not be permitted to delete one of the kernel attributes in the individual object kernel, such as individual object kernel 210C of FIG. 2C.

The user may change one of the attributes of the individual object (step 270D). In one implementation, the user identifies a displayed attribute value (such as by double-clicking, using a pointing input device, on an active area of the display that corresponds to the displayed attribute value). In response, the computer system displays an input field. The user then may key, into the input field, the new attribute value for the selected attribute. The computer system then modifies the attribute value in the individual object attribute record or in the kernel attributes of the individual object kernel that corresponds to the identified attribute.

The user may continue using process 200D to change the individual object until no additional changes are desired (step 280D). When the user desires to modify another individual object (step 290D), the user identifies another individual object to be modified (step 210D) and the process continues. When the user has completed modifying the individual object or individual objects, the the process 200D ends.

Figure 3:
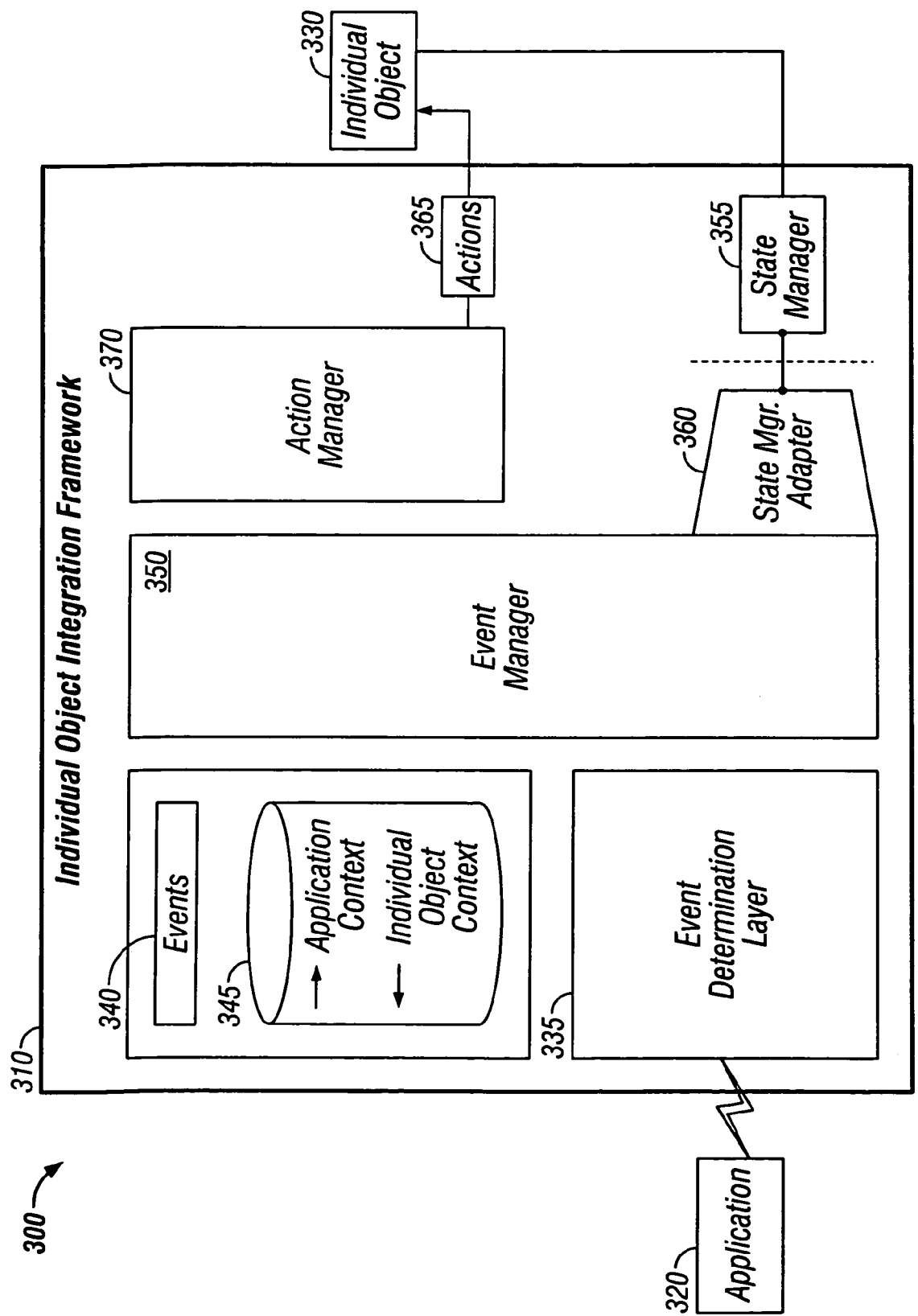
FIG. 3 is a block diagram of an integration system that integrates a software application with individual data objects

A system 300, shown in FIG. 3, includes an integration framework 310 that integrates a software application 320 with an individual object 330 that is used or altered by the software application 320. The goal of the integration framework 310 is to enable the management of an individual object's lifecycle, for example, in connection with a CRM or other similar type of solution. The customer engagement lifecycle is heavily interrelated with other lifecycles, for example, customer engagement lifecycles (for example, that are commonly tracked in CRM solutions), and business transactions (process integration). The framework 310 is not limited to a specific business process; rather, the framework 310 provides the means by which to develop standard, industry—or customer-specific scenarios with much reduced effort.

Briefly, the framework 310 functions as follows. The application 320 sends, to the integration framework 310, information that requires an action to be performed on the individual data object 330, as well as context data. The information sent by the application includes information that uniquely identifies the applicable individual data object 330. The framework 310, in response to receiving the information, determines the action to be performed on the individual object 330, and executes the action. The framework 310 also transfers context data about the individual object back to the application 320.

More specifically, the functioning of the framework 310, in one example, may be as follows. The application 320 first raises an event in the framework 310, and can do so either explicitly (by directly specifying the event) or implicitly (by passing some information that can be used to determine the event that has occurred). An event determination layer 335 makes this. determination. An "event," in this context, may be considered to be anything that requires an interaction with the individual object. For example, an event may be the individual object being sold (SELL$_{13}$OBJECT), a bill for the object being generated (BILL$_{13}$OBJECT), the object being delivered to a customer (DELIVER$_{13}$OBJECT), a request that an attribute value for the object be changed (CHANGE$_{13}$OBJECT), or simply a request to view the object and its attributes (VIEW$_{13}$OBJECT). Events 340 are registered with the framework 310 before they can be used by the framework. An event may or may not be relevant for a family of individual objects. Depending on whether an event is relevant for an object family, it can either be raised or cannot be raised by the application 320.

An event typically will have accompanying context information, which will be temporarily stored in context data containers 345. Application context is context information that is supplied from the application 320 to the individual object 330, and individual object context is context information that is supplied from the individual object 330 to the application 320. This information is carried in a container 345. Application context and individual object context that are relevant for a particular event are assigned to the event. As such, the event is aware of the event data containers that will hold the context information for it. In one example, the event data container 345, by default, may contain the following information:

| 1. EVENT_NAME | Event Name |
| 2. IOBJ_GUID | Individual Object Global Unique Identifier (GUID) |
| 3. OBJECT_FAMILY | Object Family |
| 4. LOG_HANDLE | Application Log Handle |

The event data container 345 may also be extended to hold any kind or more information that is needed. In one example, a "class" object serves as a basic event data container. The information that the class container can hold may be represented as attributes of the class. When an application wants to raise an event and pass information, then the application must create an instance of the data container and populate it by maintaining the attributes. The information in the event data container need not travel; only the reference to the container needs to be passed through the framework 310.

Data may also be pulled into an event data container from the application 320. In one scenario, the application 320 initially sends higher-level information in the application context. It may be desirable, subsequently, to pull more information from the application 320 using this higher-level information. The event data container 345 may be used to pull data from the application 320 in those cases where the application 320 supports such a process. By doing such an encapsulation, the event data container 345 becomes a container where data can be held and obtained transparently.

An event manager 350 is a component of the framework 310 that is responsible for handling events raised by the event. One of the responsibilities of the event manager 350 is to determine an action that should be performed on the individual object in response to the raised event. In one example, preconditions for the event manager 350 being able to determine the action to be performed are the following: 1) the individual object GUID is known; 2) the individual object family is known; 3) the event is known; and 4) any necessary importing, or application, context, if any, for the given event is available.

The event manager 350 may also have the responsibility to determine if the given event is one of the events that can be raised for the given individual object family. If so, then the event manager 350 handles the event, for example as follows. First, the event manager 350 locates a state manager, or state machine engine, for the individual object family. (In this example, each individual object has permissible states for certain of its attributes, as well as allowed state transitions; a state manager is used to track these states and state transitions and thus track the lifecycle of the individual object, as is discussed in more detail later.) The state manager may be a state manager 355 provided with the framework 310 shown in FIG. 3, or the state manager may be some other state manager. Next, the event manager 350 requests the applicable state manager, which for the following example will be the state manager 355, to determine a state transition for the individual object, if any. Next, the event manager 350 triggers an action manager 370 to execute the action 365 on the individual data object 330, and also requests the state manager 355 to maintain the states for the current transition. Then, the event manager 350 returns export context information (that is, individual object context), if any, and a return-code back to the application 320. To enable this to occur, the individual object context may be temporarily stored in the applicable context data containers 345.

A state manager adapter 360 is shown interconnecting the event manager 350 with the state manager 355. The state manager adapter 360 is an interface established by the framework 310 with which all state managers must comply so that they can be plugged into the framework 310. The adapter 360 accepts the application context (including the individual object GUID, among other information), and returns to the event manager 350 the appropriate state transition for the individual object 330. This allows the use of state managers ranging form the simplest ones to the most powerful ones. The simplest state manager, for example, may just determine an action for an event with no states involved. A powerful state manager, for example, may use an elaborate state mechanism and concepts like entry/exit action, guard conditions, etc., in order to determine an action for an event.

To exemplify the functions of the framework 310, the following example is illustrative. Suppose the application 320 is an ordering application for an automobile, and the application 320 has executed a function (that is, a business process) to sell a car (an individual object) with a vehicle identification number (VIN) of WE234SR65734ZX. If information indicating that such an event has occurred is transmitted to the framework 310, the framework 310 (and in particular, the event manager 350 in coordination with the state manager 355), will determine whether the car can be sold, and if so, the action manager 370 causes the following two actions to be performed on the individual object: 1) a "vehicle owner" attribute is linked with a particular business partner (the new owner of the car), and 2) a record of the sale event is recorded in a history record for the individual object.

As mentioned previously, each individual object has permissible states for certain of its attributes, as well as allowed state transitions; the state manager (such as state manager 355) is used to track these states and state transitions, and thus track the lifecycle of the individual object. A "state" is a condition or situation during the life of an individual object during which the object satisfies some condition, performs some activity, or waits for some event. For example, if a house is "waiting to be sold," it may be said to be in state AVAILABLE; if a software license "has an owner," it may be said to be in state SOLD; if a car is "being produced," it may be said to be in state IN_PRODUCTION. In this sense, a state abstracts the condition or situation during the life of an individual object into a simple identifying word or phrase. A user defines the states that an individual object can be in at any given point in time. A state may have a unique identifier, a name and some description. Also, an individual object's life cycle starts and ends somewhere. To represent this, two special states may be used—an initial state, which indicates a default starting place, and a final state, which indicates a completion state.

Transitions represent a flow of control between the states of an individual object. A transition is a relationship between two states indicating that an individual object in the first state (a "from state") will perform a certain action and enter a second state (a "to state") when a specified event occurs and specified conditions (guard conditions) are satisfied. On such a change of the state, a transition may be said to fire. Until the transition fires, the individual object is said to be in the "from state," and after the transition fires, it is said to be in the "to state."

Figure 4:
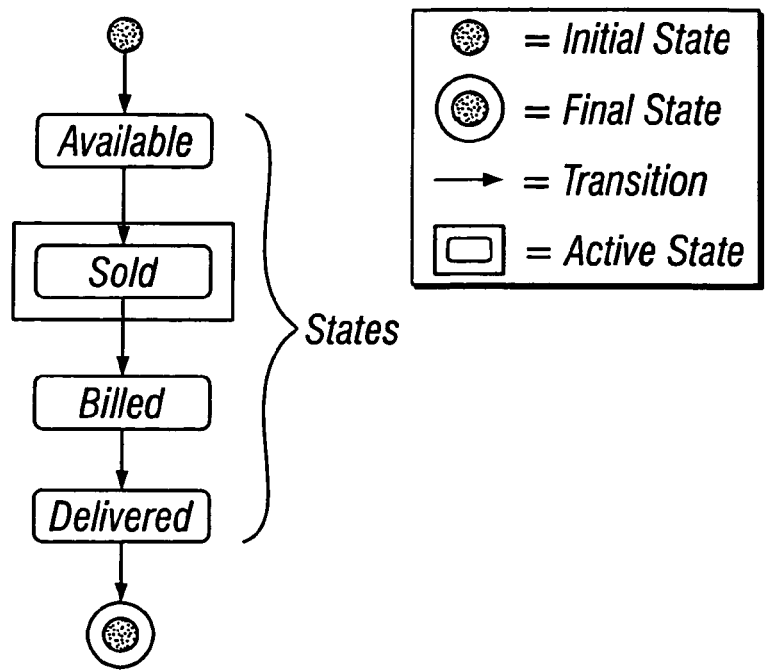
FIGS. 4-6 are state and transition diagrams for example individual data objects.

Referring to FIG. 4, a graphical representation of the flow of a life cycle (or part of a life cycle) of an example individual object is shown. The individual object to which this example applies may be, for example, an automobile. Following the initial state, the individual object transitions to an "available" state, from there to a "sold" state, from there to a "billed" state, from there to a "delivered" state, and from there to a final state. The active state (that is, the state in which the object currently is) is indicated in the figure by a box being drawn around that state (that is, the "sold" state).

For each state, there may be entry actions and exit actions. An entry action is an action that will be executed upon transitioning into the state, and an exit action is an action that will be executed upon transitioning out of the state. When a transition is fired, first the exit action for the "from state" may be executed, and then the entry action for the "to state" may be executed. By way of example, an entry action for the "sold" state shown in FIG. 4 may be to write to a history record. As such, when the automobile is sold, certain information regarding the sale may be written into the history record for the sale.

Figure 5:
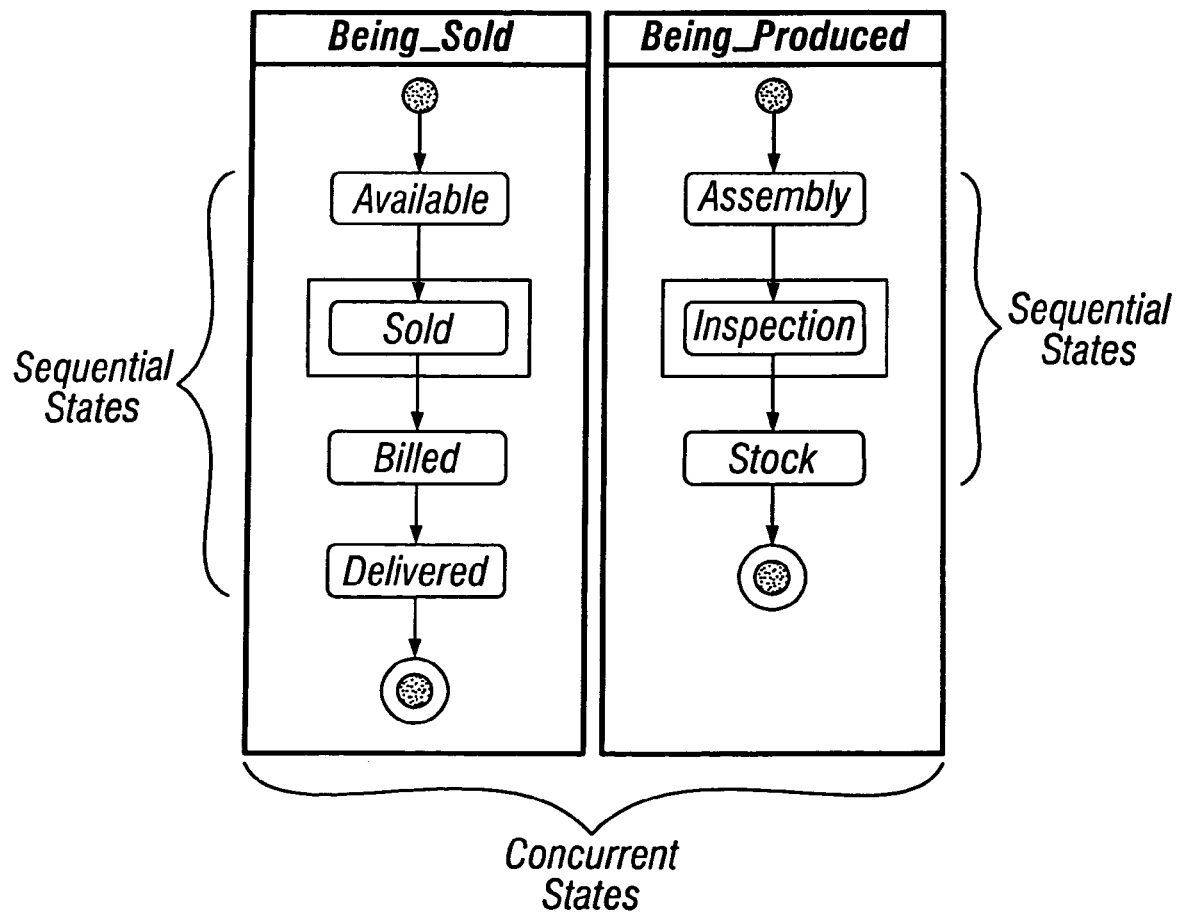

In FIG. 4, the states shown in the diagram may be called "sequential states" because not more than one of them can be active for an individual object at any given instant of time. The individual object whose lifecycle is modeled in FIG. 4 can either be in state AVAILABLE, SOLD, BILLED, or DELIVERED, but cannot be in two or more of these states at the same time. In addition to sequential states, there also may be "concurrent states" in an individual object's lifecycle. Referring to FIG. 5, concurrent states are shown. The states shown in FIG. 5 are concurrent states because more than one of them can be active for an individual object at any given instant of time. In FIG. 5, a composite state called BEING_SOLD includes the sub-states previously shown in FIG. 4. Also in FIG. 5, another composite state called BEING_PRODUCED includes the sub-states of ASSEMBLY, INSPECTION and STOCK. A "composite state" is a state that has nested states within it, and the nested states may be referred to as "sub-states." A composite state can either contain concurrent sub-states or sequential sub-states. In the FIG. 5 example, the BEING_SOLD and BEING_PRODUCED states may occur concurrently. Also more specifically, the individual object may be in the SOLD and INSPECTION sub-states at the same time, as is indicated in FIG. 5.

Figure 6A:
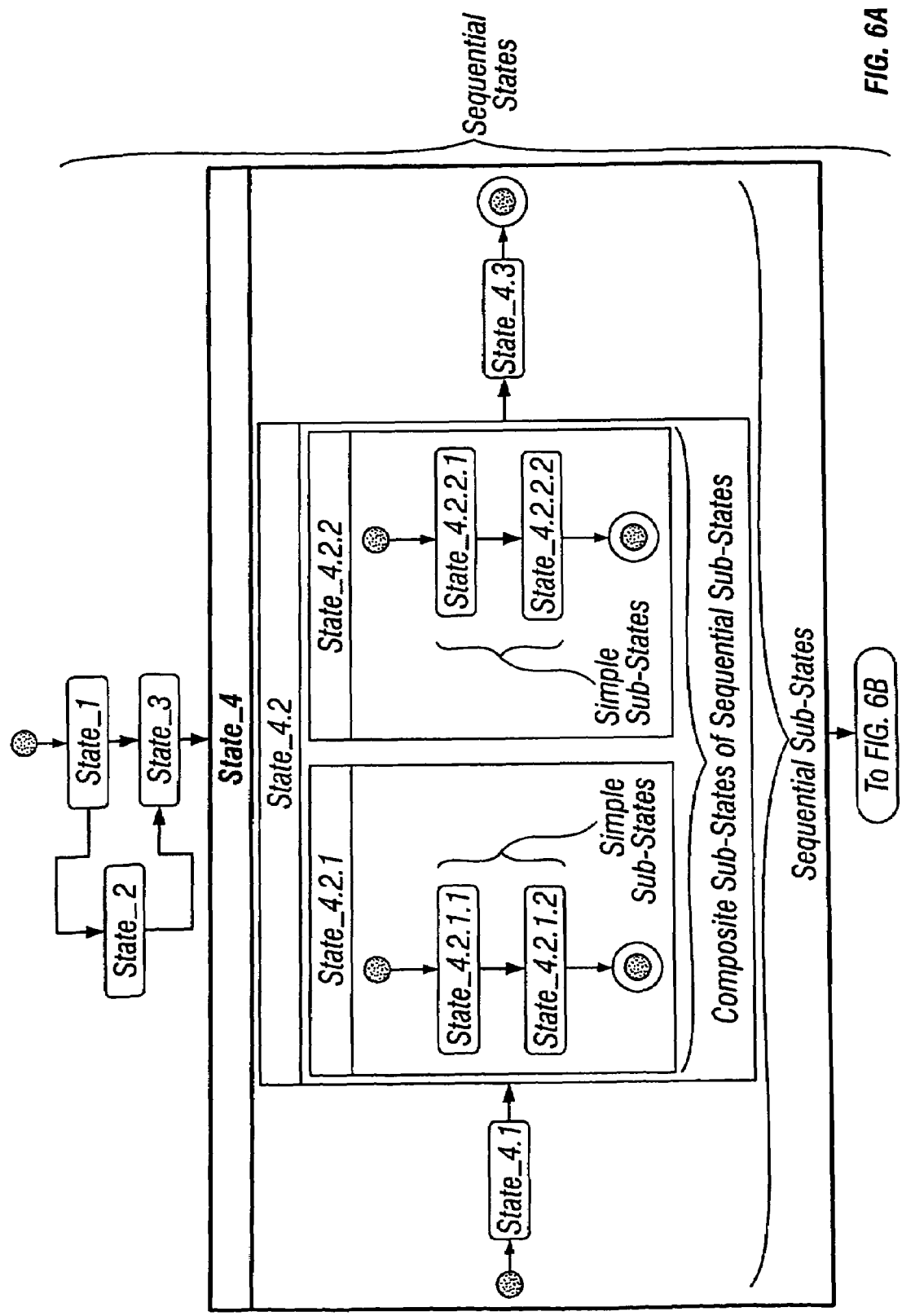
Figure 6B:
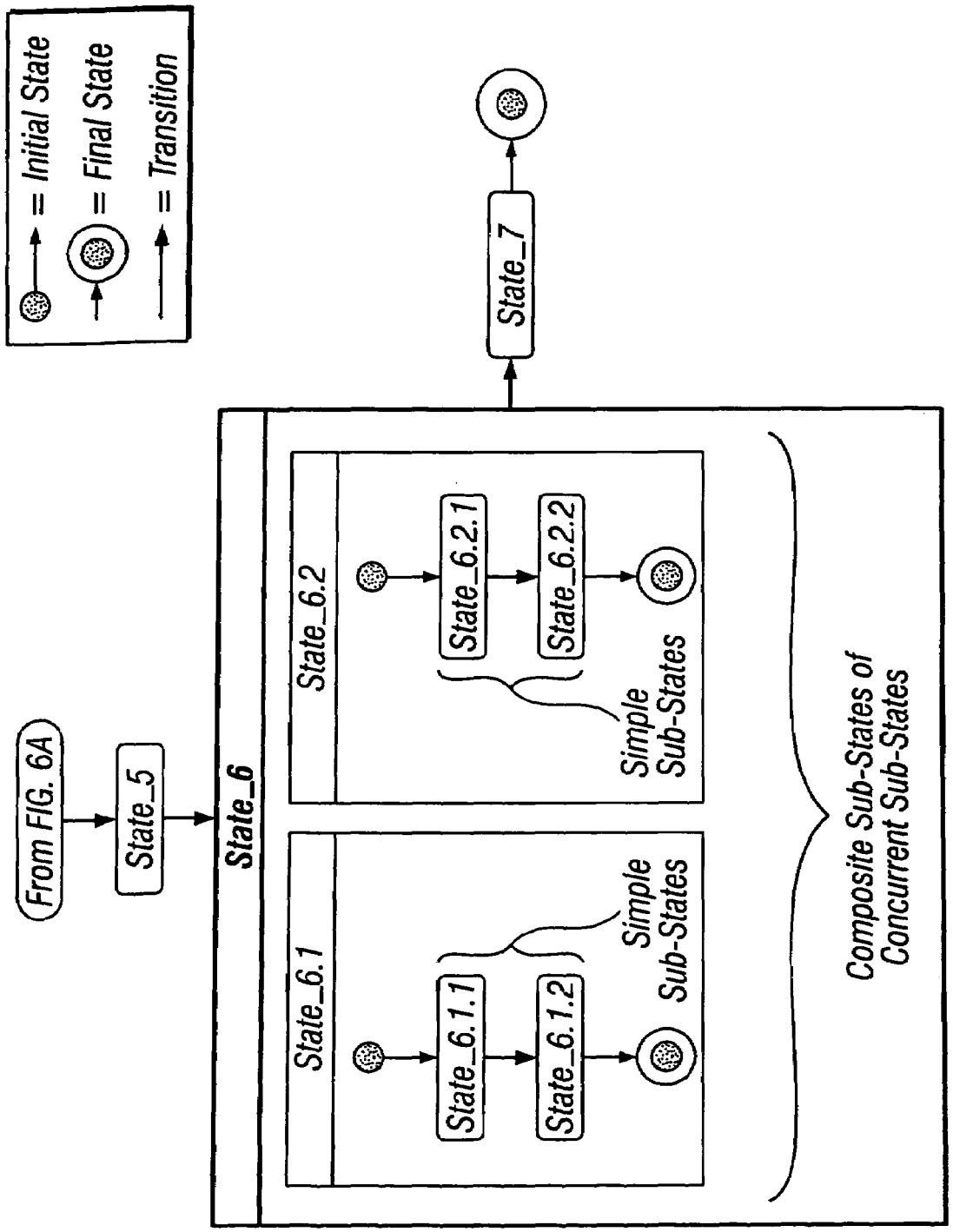

FIGS. 6A and 6B together show a more detailed individual object lifecycle. This example does not relate to a particular business scenario, but instead, refers generally to states to depict how different business scenarios may be modeled. From STATE_1, the individual object may either transition to STATE_2 and then to STATE_3, or alternatively may transition directly to STATE_3 and skip STATE_2. STATE_4 is a composite state, made up of nested sequential sub-states of STATE_4.1, STATE_4.2 and STATE_4.3. Sub-state STATE_4.2 is not only a sub-state, but itself is a composite state, with two sequential sub-states (STATE_4.2.1 and STATE_4.2.2, which each have sequential sub-states). After transitioning through the sub-states of STATE_4, the lifecycle of the individual object proceeds sequentially to STATE_5 (FIG. 6B) and then STATE_6. STATE_6 is a composite state of two concurrent sub-states, which in turn each have their own simple sequential sub-states. Because the sub-states of STATE_6 are concurrent, the FINAL STATE of both STATE_6.1 and STATE_6.2 must be reached before there is a transition from STATE_6 to STATE_7. From STATE_6, the next transition in the life cycle is to STATE_7 and from there to the FINAL STATE.

From the state diagrams shown in FIGS. 4-6B, it can be seen that there are essentially two levels of states. First, there are states at the root level, or composite states, and states within a composite state, or sub-states. "N" level of nested states may be allowed, and "N" concurrent states may also be allowed. Transitions occur among states at the same level of the hierarchy.

Next is a discussion of configuring a state manager, such as the state manager 355 shown in FIG. 3. The state manager 355 may be configured in steps in order to model an object family's life cycle. A designer may model the object family going from one level to the next level in the hierarchy of state levels. A top-down methodology may be followed by the designer of the lifecycle, beginning with the top-most level and drilling down to lower levels.

Figure 7:
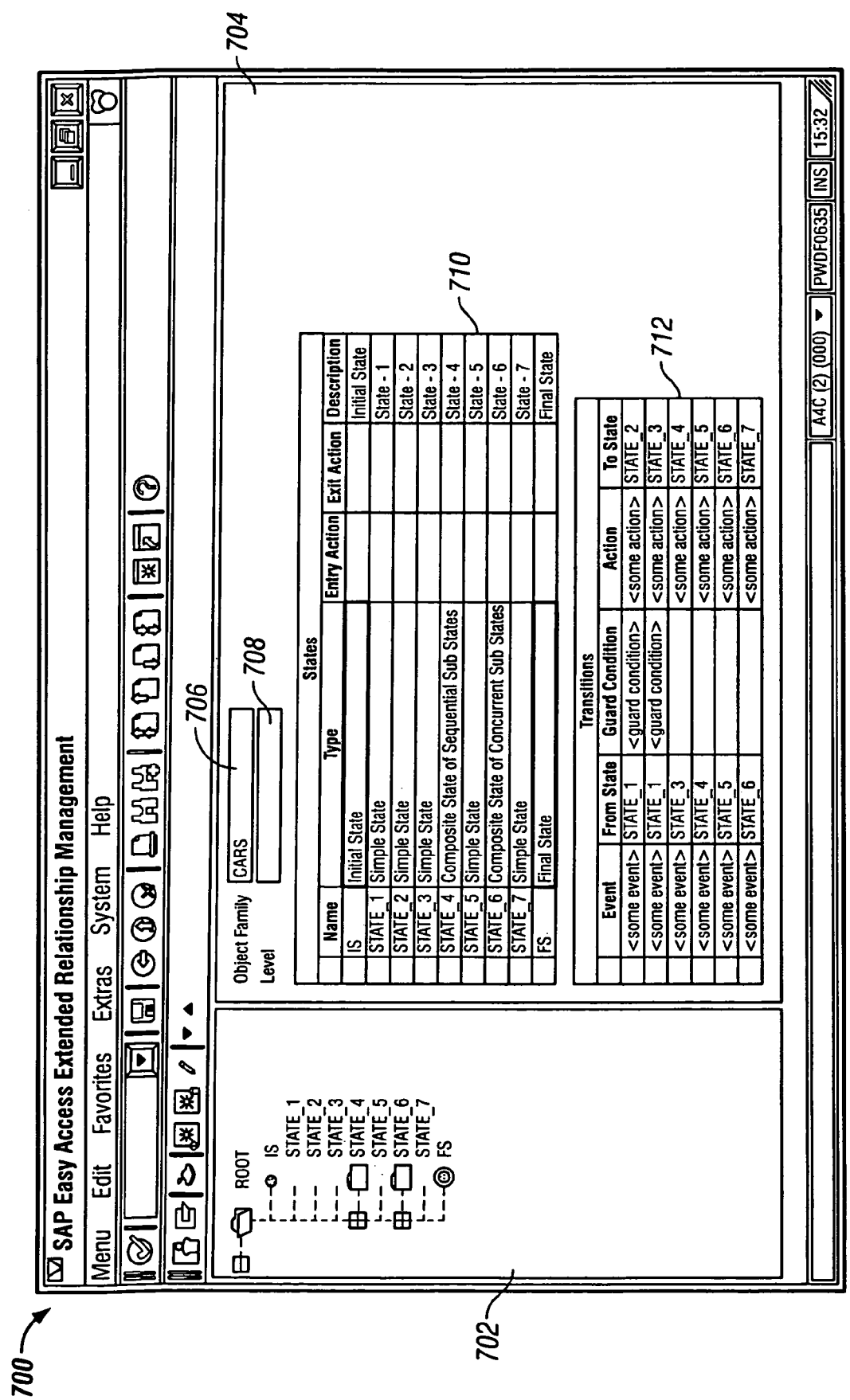
FIGS. 7-9 are screen snapshots of a tool to design and maintain states and transitions for individual data objects.
Figure 8:
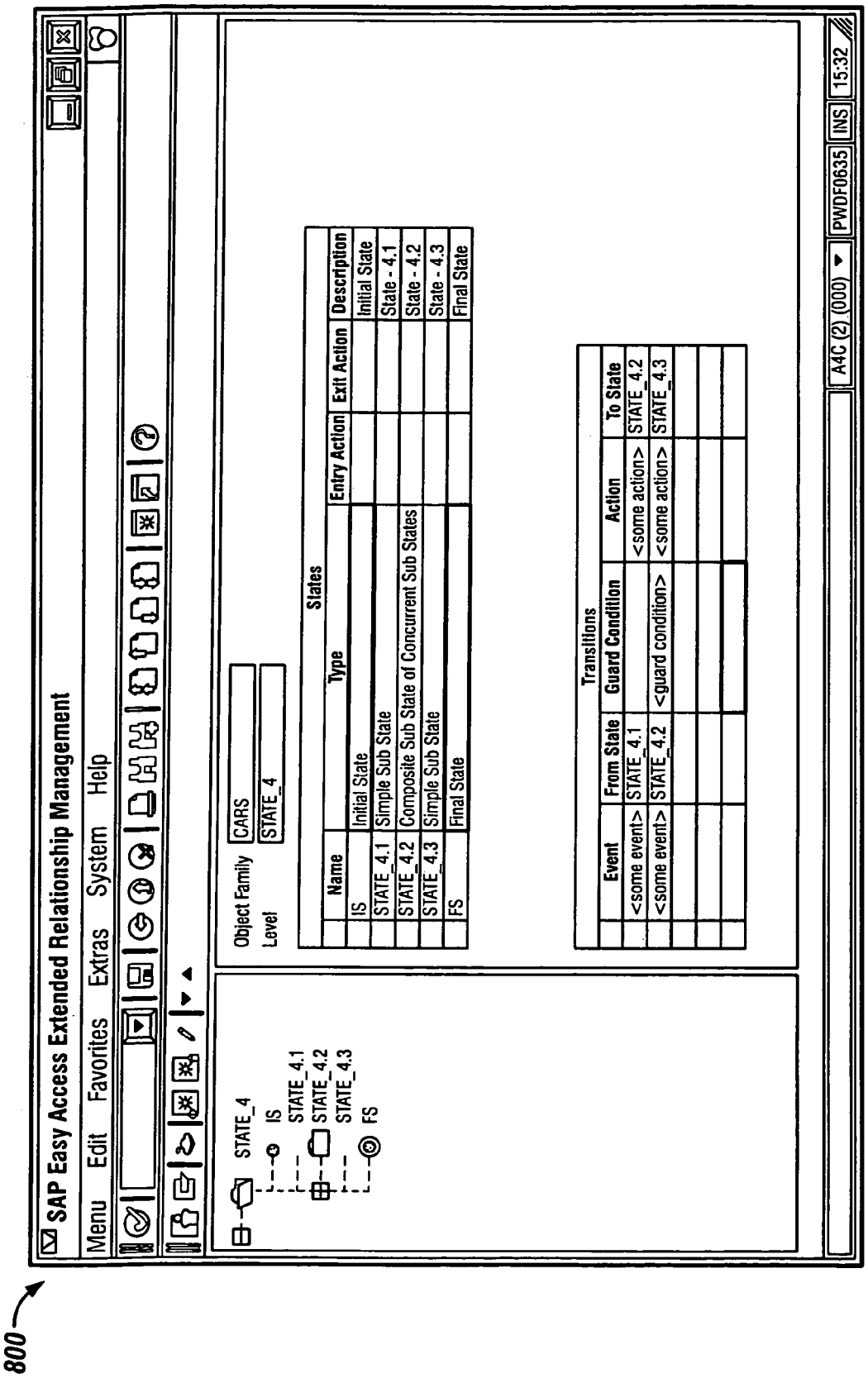
Figure 9:
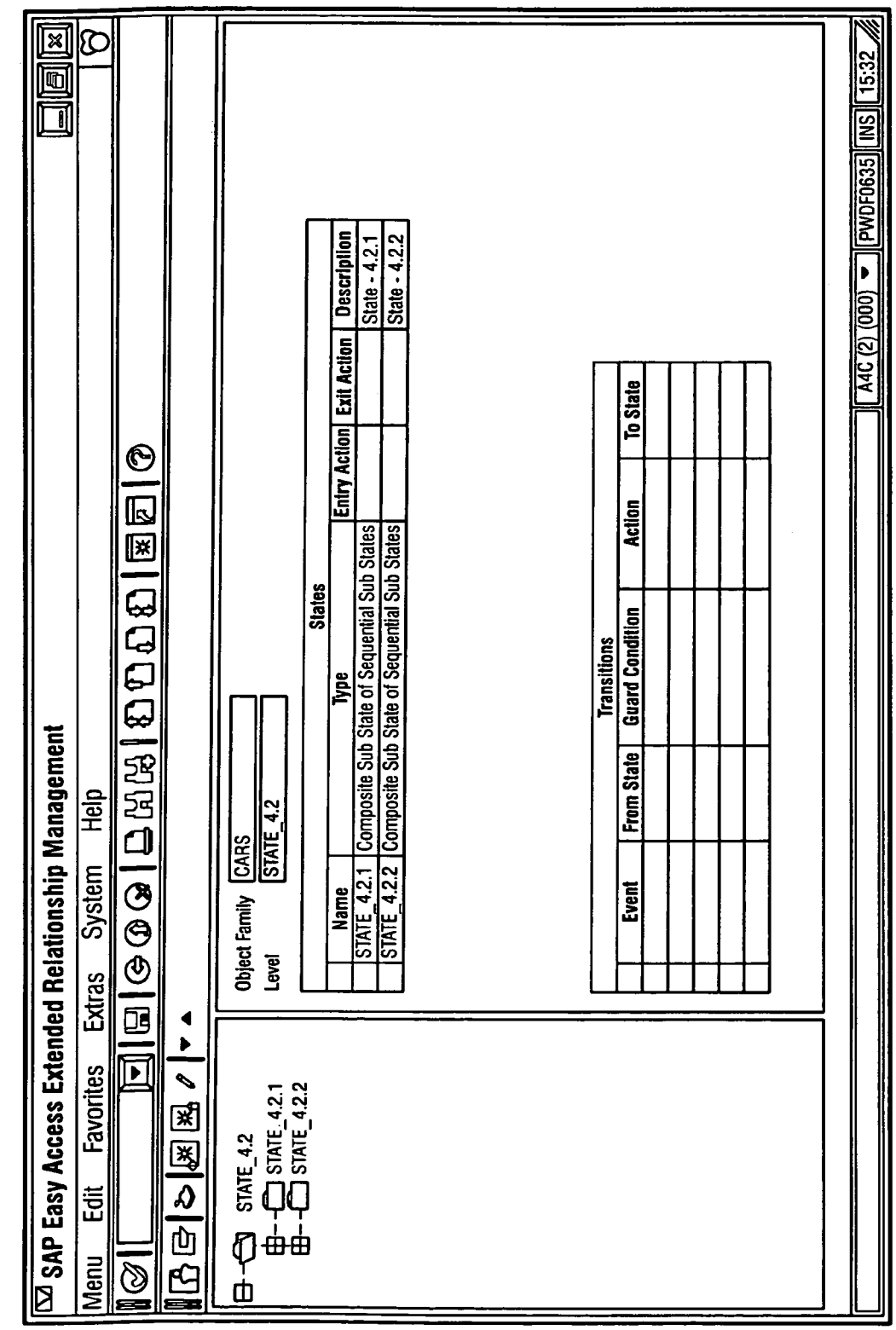

FIGS. 7-9 show user interface screens that illustrate the process a designer may go through to model the lifecycle of an individual object family. In this example, the modeling is of the individual object family shown in FIGS. 6A and 6B. In the first screen 700 shown in FIG. 7, there is an area 702 on the left side of the screen 700 that displays a collapsible, hierarchical state directory. As shown, there is a "root" state, which includes all of the states at the same level—the INITIAL STATE, STATE_1 through STATE_7, and FINAL STATE. In FIG. 7, the state directory area 702 is not expanded to display the sub-states of STATE_4 and STATE_6.

In a details area 704 on the right-hand side of the screen 700, there is a box 706 within which an object family name is identified. In this example, the object family is "CARS." A second box 708 displays the state level being shown in the details area 704. In FIG. 7, because the highest level is being shown, the LEVEL box 708 is empty. There are also a "states" table 710 and a "transitions" table 712 that are displayed in the details area 704.

Using the "states" table 710, a user begins at a top-most level (the root level) by listing all the states that are relevant at this level. The user enters a name for each state and a description to document the state. Additionally, the user specifies what type of state it is—that is, whether the state is a simple state, a composite state of sequential sub-states, or a composite state of concurrent sub-states. The table 710 may, by default, identify the initial state (IS) and the final state (FS). After entering the state information, a "save" button may be entered and the tree in the directory area 702 may be refreshed to give the user an easy overview of where the user is in the hierarchy of states and what the user has done. In the tree shown in the directory area 702, a leaf node with no icon means that the state is a simple state. An expandable node means that the state is a composite state. The folder icon next to the composite state may be used to indicate whether the composite state is a composite state of sequential sub-states (as is the case for STATE_4) or a composite state of concurrent sub-states (where a different folder icon would appear for STATE_6—not shown).

After the user specifies all of the states at the root level using the state table 710, the user then uses the transitions table 712 to specify the transitions at this level. For each transition, the user identifies the event that triggers the transition, the "from state," any guard condition (that is, a condition that must be met in order for the transition to occur), any actions that may occur when the transition occurs, and the "to state."

If any of the states at the root level is a composite state, then it is necessary to define the states and transitions of the composite state. In FIG. 7, it can be seen, from both the directory area 702 and the details area 704, that STATE_4 and STATE_6 are composite states. To specify the sub-states in STATE_4, double clicking on the STATE_4 composite state icon in the directory area (or in the states table 710) takes the user to the display shown in FIG. 8, which displays a screen 800 of the next lower level of states under STATE_4. A screen of the type shown in FIG. 8 will appear where the composite state is made up of sequential sub-states, or in other words, a screen of the type shown in FIG. 8 will appear where there is a composite state of sequential sub-states. Because the sub-states in FIG. 8 are sequential, the screen 800 shown in FIG. 8 looks very similar to the screen 700 shown in FIG. 7. The only difference is that now the user is not at the top-most level (that is, not at the root level), but rather is at a sub-level within composite state (LEVEL=STATE_4). Again, the user specifies the states and transitions using the applicable tables as before, and after clicking the "save" button, the tree in the directory area is refreshed to give the user an easy overview of where the user is and what the user has done.

Referring now to FIG. 9, screen 900 displays the details for STATE_4.2, which is a composite state of concurrent sub-states. Because the sub-states are concurrent, there are no initial or final states. In this example, it may only be possible to specify states that are of the type "composite state of sequential sub-states." These are concurrent states. No transitions can happen between concurrent states, and hence the "transitions". table is grayed out. In the FIG. 9 screen 900, only two concurrent states are specified. After the user clicks on the "save button," the tree on the left-hand side of the screen 900 (that is, the directory area) is refreshed as described before.

Using this method of modeling the states and transitions, some or all of the following advantages may be achieved. The number of transitions may be reduced when modeling complex behavior. Usually only one or two levels of nesting may be sufficient to model complex behavior, even though many more are possible. The lifecycle is very easy to configure and to maintain because the user is always focused, instead of getting lost.

Figure 10:
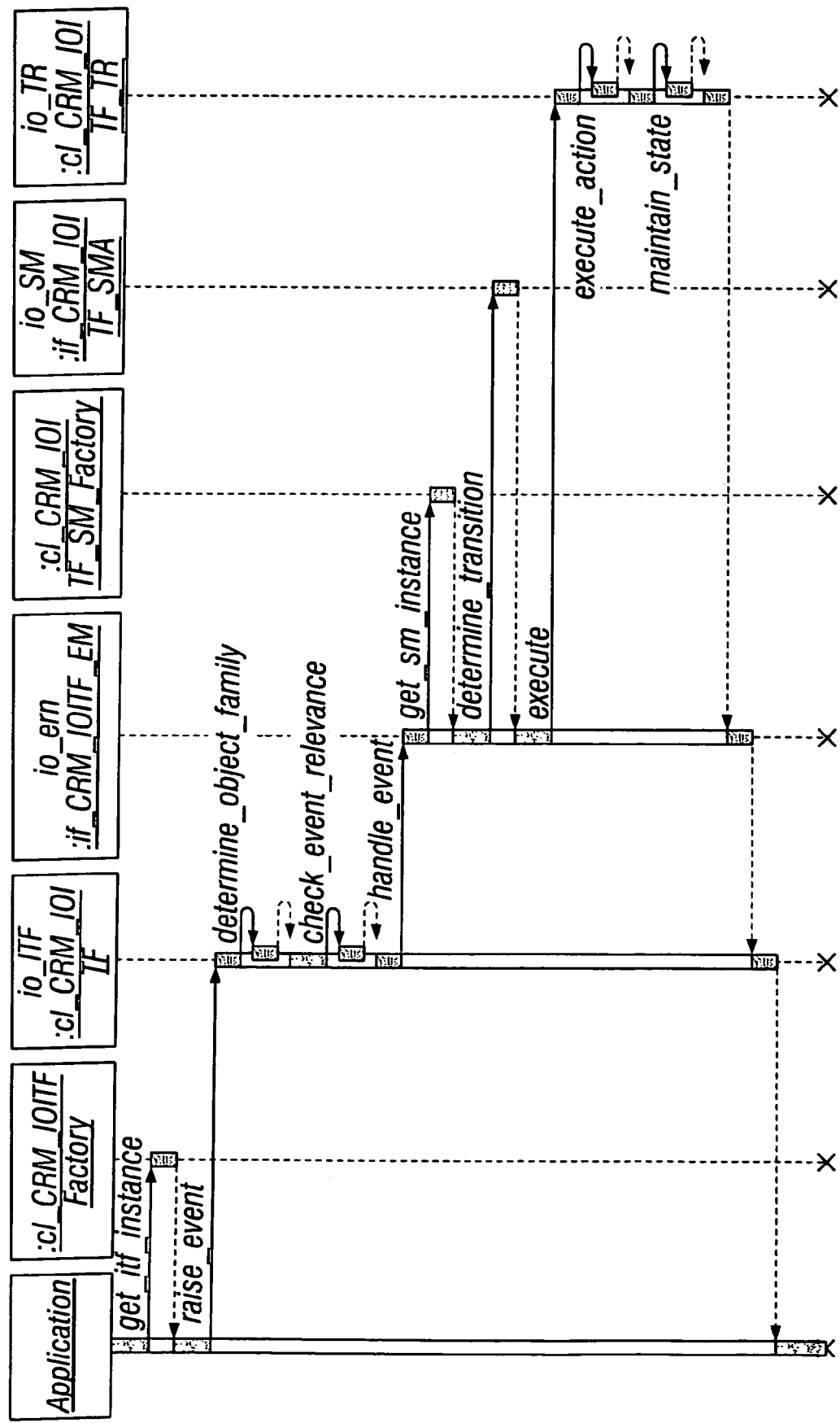
FIGS. 10-13 are sequence diagrams illustrating the operation of an integration system such as the system shown in FIG. 3.

FIGS. 10-13 are sequence diagrams that further describe the behavior of the individual object integration framework 310 shown in FIG. 3. FIG. 10 illustrates how the framework 310 works when an event is raised explicitly by the application 320. As shown in FIG. 10, first the application 320 gets an integration framework instance for the event operation to take place. Next, the application 320 raises the event to the framework 310, which in turn first determines the object family and then checks whether the event is relevant to the identified individual object family. Next, the event manager 350 is triggered to handle the event, and in turn the event manager 350 first gets a state manager instance and then through the state manager adapter 360 receives the determined state transition. Next, the event manager 350 triggers the execution of the action by the action manager 370, and the states are maintained in the state manager 355.

Figure 11:
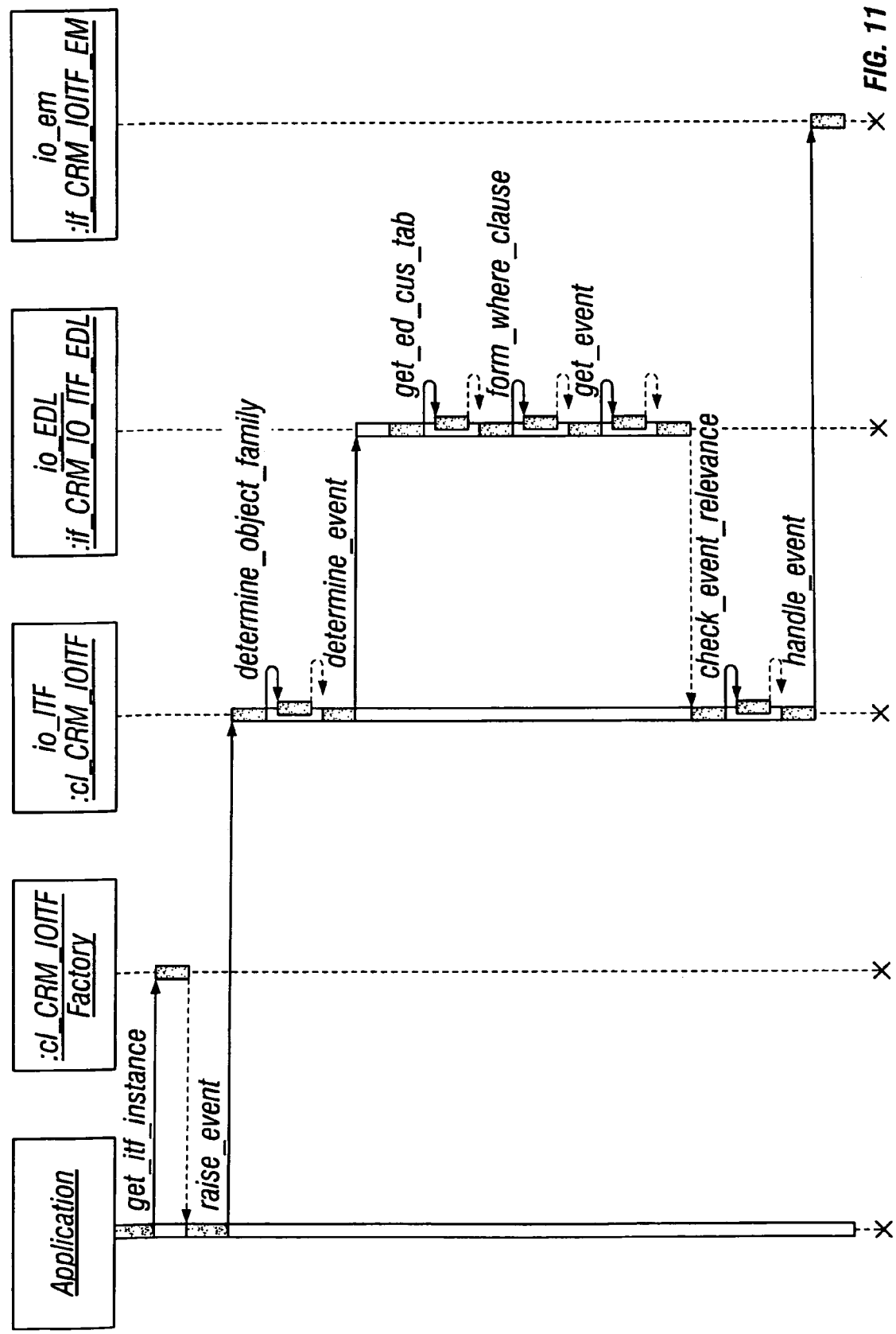

FIG. 11 shows the framework 310 behavior when the application 320 raises an event implicitly. The sequence here is similar to the FIG. 10 sequence, except that the event determination layer 335 is called upon to determine the event that has occurred from the information provided to the framework 310 from the application. The behavior from the event manager 350 onwards is not shown in FIG. 11, but may be the same as shown in FIG. 10.

Figure 12:
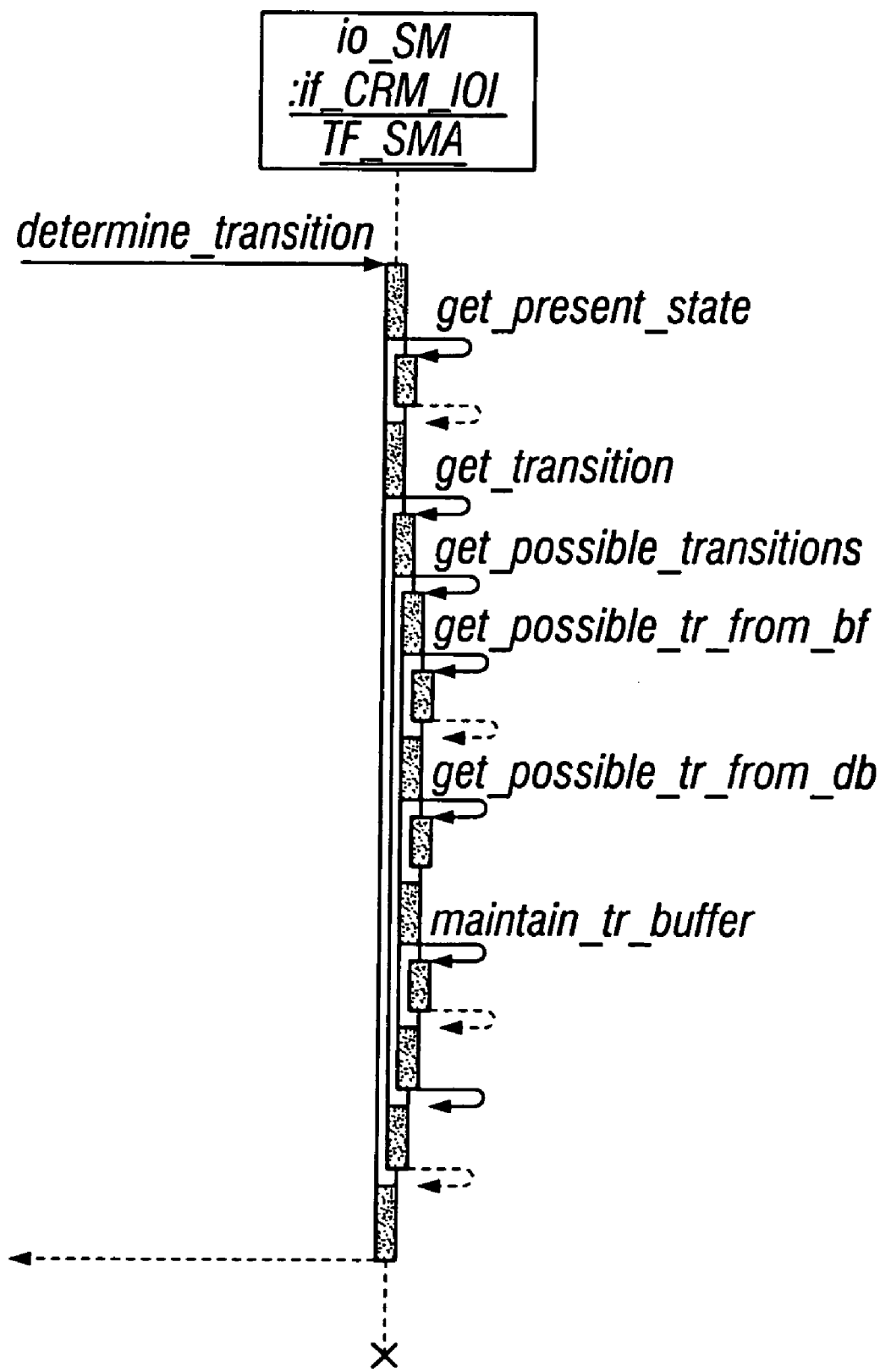
Figure 13:
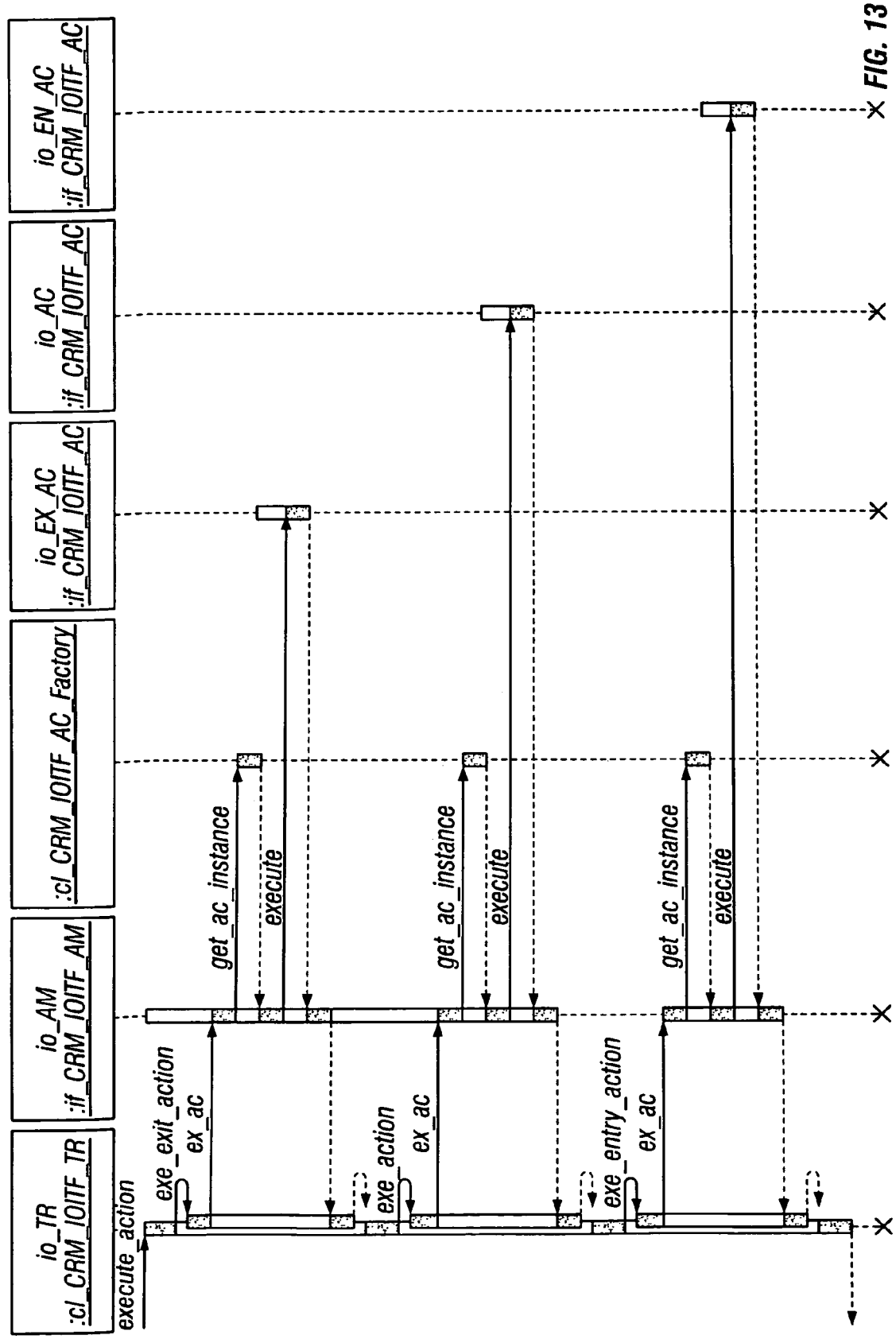

FIG. 12 shows the behavior of the framework's state manager 355. Upon being called to determine the transition, the state manager 355 first gets the present state for the individual object, and then gets the transition that is to occur. Finally, FIG. 13 shows what happens when a transition is fired. Upon the call being made to execute the action (as is also shown in FIG. 10), first an exit action for the "from state" is executed by the action manager 370. Next the action associated with the transition is executed by the action manager 370. Finally, an entry action for the "to state" is executed by the action manager 370.

Figure 14:
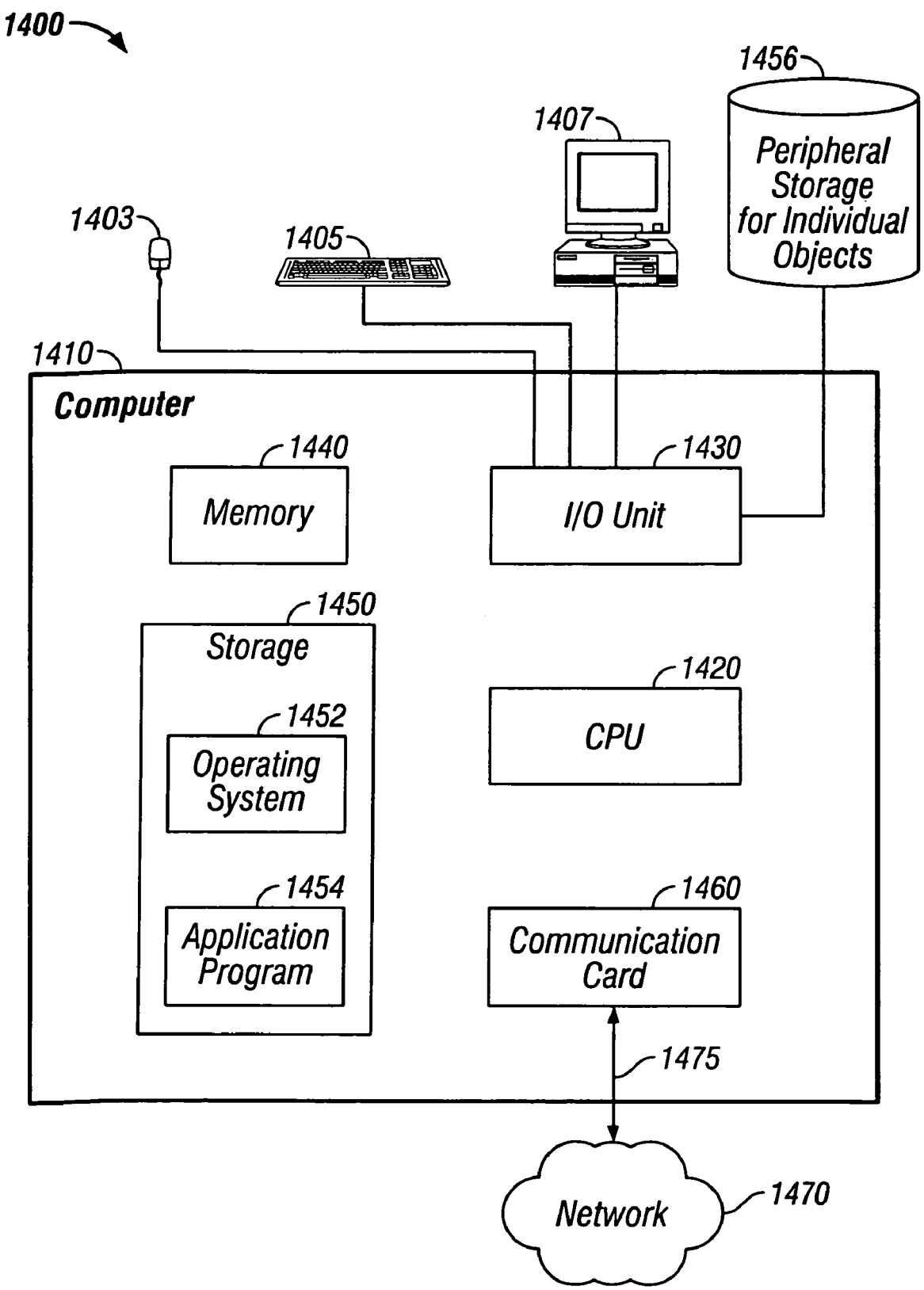
FIG. 14 is a block diagram illustrating a computer system capable of implementing a process, for creating and modifying individual objects.

Referring to FIG. 14, a computer system 1400 for creating and modifying individual objects is shown. The computer system 1400 includes a variety of input/output (I/O) devices (e.g., mouse 1403, keyboard 1405, and display 1407) and a computer 1410 having a central processor unit (CPU) 1420, an I/O unit 1430, a memory 1440, and a data storage device 1450. Data storage device 1450 may store machine-executable instructions, data, and various programs, such as an operating system 1452 and one or more application programs 1454, for implementing a process for creating and modifying individual objects, all of which may be processed by CPU 1420. Each computer program may be implemented in a high-level procedural or object-oriented programming language, or in assembly or machine language if desired; and, in any case, the language may be a compiled or interpreted language. Data storage device 1450 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; and Compact Disc Read-Only Memory (CD-ROM).

System 1400 may include one or more peripheral online storage devices 1456 for storing individual objects. Peripheral online storage device 1456 may use any storage media (including magnetic, optical or solid state storage media) or any type of storage device (including a drive, a microdrive, a compact disc (CD), a recordable CD (CD-R), a rewriteable CD (CD-RW), a flash memory, or a solid-state floppy disk card (SSFDC)).

System 1400 also may include a communications card or device 1460 (e.g., a modem and/or a network adapter) for exchanging data with a network 1470 using a communications link 1475 (e.g., a telephone line, a wireless network link, a wired network link, or a cable network). Other examples of system 1400 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

The described techniques may be implemented using different data management techniques. For example, some implementations may store individual objects and other types of master data in a relational database that logically organizes data into a series of database tables. A database table may arrange data associated with a master data object in a series of columns and rows. Each column may describe an attribute of the entity for which data is being stored. Each row may represent a collection of attribute values for a particular entity. Individual objects or other types of master data also may be stored in an object database that relies on data management technology other than a relational database. Individual objects or other types of master data also may be stored as XML (Extensible Mark-up Language) documents.

A number of embodiments of the invention have been described. Nevertheless, it will be understood that various modifications may be made without departing from the spirit and scope of the invention. Accordingly, other embodiments are within the scope of the following claims.

What is claimed is:

1. A method for user modeling, within a computer system, of a lifecycle of uniquely identified computer data objects that are members of a computer data object family, the method comprising:

accessing user-defined state information associated with a data object family, the state information including:

a set of permissible states for data objects associated with the data object family, the set of permissible states including at least a first permissible state and a second permissible state that is different than the first permissible state, conditions defining events that result in transitions between permissible states included in the set of permissible states, the conditions including a first condition defining a first event that results in transition from the first permissible state to the second permissible state, and actions that occur in response to transitions between permissible states included in the set of permissible states, the actions including a first action that occurs in response to a transition from the first permissible state to the second permissible state; and creating a data object associated with the data object family that includes one or more data attributes, history data, and data identifying a state of the data object, the state of the data object being at least one of the permissible states included in the set of permissible states associated with the data object family and the first data object corresponding to a tangible asset associated with an asset family that corresponds to the data object family;

configuring the data identifying the state or the data object to identify the state of the data object as the first permissible state;

receiving an indication of occurrence of an event associated with the tangible asset corresponding to the data object;

determining whether the event is the first event defined by the first condition; and in response to determining that the event is the first event defined by the first condition, transitioning the data object from the first permissible state to the second permissible state by:

updating the data identifying the state of the data object to identify the state of the data object as the second permissible state;

performing the first action;

modifying an attribute value for at least the one or more data attributes included in the data object based on the event; and storing, in the history data included in the data object, data related to the event.

2. The method of claim 1 wherein the first event is an event identified and provided by a software application system.

3. The method of claim 1 wherein the first event is an event determined from information provided by a software application system.

4. The method of claim 3 further comprising receiving an identification of context information provided by the software application system, wherein determining whether the event is the first event defined by the first condition comprises determining whether the event is the first event defined by the first condition based on the context information.

5. The method of claim 1 wherein the first action is an exit action that occurs in response to transition from the first permissible state.

6. The method of claim 1 wherein the first action is an entry action that occurs in response to transition to the second permissible state.

7. The method of claim 1 wherein:
the first action is an exit action that occurs in response to transition from the first permissible state,
the actions that occur in response to transitions between permissible states included in the set of permissible states include an entry action that occurs in response to transition to the second permissible state, and
transitioning the data object from the first permissible state to the second permissible state includes performing the exit action and the entry action.

8. The method of claim 1 wherein the first action is the creation of a computer history record that documents occurrence of the first event.

9. The method of claim 1 wherein the first action is the storing of a new attribute value for a specified attribute of the data object associated with the data object family.

10. The method of claim 1 wherein accessing the state information includes accessing the state information associated with the data object family from a computer system that interacts with a repository of data objects.

11. The method of claim 1 wherein the data object is a first data object and the tangible asset is a first tangible asset, further comprising:
creating a second data object, different than the first data object, associated with the data object family that includes data identifying a state of the second cats object, the state of the second data object being at least one of the permissible states included in the set of permissible states associated with the data object family and the second data object corresponding to a second tangible asset, different than the first tangible asset, associated with the asset family that corresponds to the data object family;
configuring the data identifying the state of the second data object to identify the state of the data object as the first permissible state;
receiving an indication of occurrence of an event associated with the second tangible asset corresponding to the second data object;
determining whether the event associated with the second tangible asset is the first event defined by the first condition; and
in response to determining that the event associated with the second tangible asset is the first event defined by the first condition, transitioning the second data object from the first permissible state to the second permissible state by:
updating the data identifying the state of the second data object to identify the state of the data object as the second permissible state; and
performing the first action.

12. The method of claim 1 further comprising:
in response to determining that the event is not the first event defined by the first condition or any other event that results in transition from the first permissible state, maintaining the data identifying the state of the data object to identify the state of the data object as the first permissible state.

13. The method of claim 1 wherein updating the data identifying the state of the data object to identify the state of the data object as the second permissible state comprises:

updating the data identifying the state of the data object to identify the state of the data object as the second permissible state, and
maintaining the data identifying the state of the data object to identify the state of the data object as the first permissible state such that the data identifies the data object as being concurrently in the first permissible state and the second permissible state.

14. The method of claim 1 wherein modifying the attribute value for at least one of the one or more data attributes included in the data object based on the event includes modifying a business partner attribute to link the data object to a business partner record corresponding to a business partner involved in the event.

15. A computer program product stored on a computer-readable storage medium comprising program instructions that cause a computer system to perform a method for user modeling of a lifecycle of uniquely identified computer data objects that are members or a computer data object family, the method comprising:
accessing user-defined state information associated with a data object family, the state information including:
a set of permissible states for data objects associated with the data object family, stored on a computer-readable storage medium the set of permissible states including at least a first permissible state and a second permissible state that is different than the first permissible state,
conditions defining events that result in transitions between permissible states included in the set of permissible states, the conditions including a first condition defining a first event that results in transition front the first permissible state to the second permissible state, and
actions that occur in response to transitions between permissible states included in the set of permissible states, the actions including a first action that occurs in response to a transition front the first permissible state to the second permissible state; and
creating a data object associated with the data object family that includes data identifying a state of the data object, the state of the data object being at least one of the permissible states included in the set of permissible states associated with the data object family and the first data object corresponding to a tangible asset associated with an asset family that corresponds to the data object family;
configuring the data identifying the state of the data object to identify the state of the data object as the first permissible state;
receiving an indication of occurrence of an event associated with the tangible asset corresponding to the data object;
determining whether the event is the first event defined by the first condition; and
in response to determining that the event is the first event defined by the first condition, transitioning the data object from the first permissible state to the second permissible state by:
updating the data identifying the state of the data object to identify the state of the data object as the second permissible state; and
performing the first action.

16. The computer program product of claim 15 wherein the first event is an event identified and provided by a software application system.

17. The computer program product of claim 15 wherein the first event is an event determined from information provided by a software application system.

18. The computer program product of claim 17 wherein the method further comprises receiving an identification of context information provided by the software application system, wherein
determining whether the event is the first event defined by the first condition comprises determining whether the event is the first event defined by the first condition based on the context information.

19. The computer program product of claim 15 wherein the first action is an exit action that occurs in response to transition from the first permissible state.

20. The computer program product of claim 15 wherein the first action is an entry action that occurs in response to transition to the second permissible state.

21. The computer program product of claim 15 wherein:
the first action is an exit action that occurs in response to transition from the first permissible state,
the actions that occur in response to transitions between permissible states included in the set of permissible states include an entry action that occurs in response to transition to the second permissible state, and
transitioning the data object from the first permissible state to the second permissible state includes performing the exit action and the entry action.

22. The computer program product of claim 15 wherein the first action is the creation of a computer history record that documents occurrence of the first event.

23. The computer program product of claim 15 wherein the first action is the storing of a now attribute value for a specified attribute of the data object associated with the data object family.

24. The computer program product of claim 15 wherein accessing the state information comprises accessing the state information from a computer system that interacts with a repository of data objects.

25. The computer program product of claim 15 wherein:
creating a data object associated with the data object family includes creating a data object that includes one or more data attributes, history data, and data identifying a state of the data object; and
transitioning the data object from the first permissible state to the second permissible state includes:
modifying an attribute value for at least one of the one or more data attributes included in the data object based on the event; and
storing, in the history data included in the data object, data related to the event.

26. A computer system comprising:
a processor;
an electronic data store including user-defined state information associated with a data object family, the state information including:
a set of permissible states for data objects associated with the data object family, the set of permissible states including at least a first permissible state and a second permissible state that is different than the first permissible state,
conditions defining events that result in transitions between permissible states included in the set of permissible states, the conditions including a first condition, defining a first event that results in transition from the first permissible state to tho second permissible state, and
actions that occur in response to transitions between permissible states included in the set of permissible states, the actions including a first action that occurs in response to a transition from the first permissible state to the second permissible state; and executable instructions that, when executed by the processor, perform operations comprising:
accessing, from the electronic data store, the user-defined state information associated with the data object family;
creating a data object associated with the data object family that includes data identifying a state of the data object, the state of the data object being at least one of the permissible states included in the set of permissible states associated with the data object family and the first data object corresponding to a tangible asset associated with an asset family that corresponds to the data object family;
configuring the data identifying the state of the data object to identify the state of the data object as the first permissible state;
receiving an indication of occurrence of an event associated with the tangible asset corresponding to the data object;
determining whether the event is the first event defined by the first condition; and
in response to determining that the event is the first event defined by the first condition, transitioning the data object from the first permissible state to the second permissible state by:
updating the data identifying the state of the data object to identify the state of the data object as the second permissible state; and
performing the first action.

27. The computer system of claim 26 wherein:
creating a data object associated with the data object family includes creating a data object that includes one or more data attributes, history data and data identifying a state of the data object; and
transitioning the data object from the first permissible state to the second permissible state includes:
modifying an attribute value for at least one of the one or more data attributes included in the data object based on the event; and
storing, in the history data included in die data object, data related to the event.

28. A computer-implemented method for modeling a lifecycle of uniquely identified computer data objects that are members of a computer data object family, the method comprising:
accessing state information, associated with a data object family, the state information including a set of permissible states for data objects associated with the data object family, the set of permissible states including at least:
first permissible state;
a second permissible state, the second permissible state being an optional state;
a third permissible state;
a fourth permissible state, the fourth permissible state being a composite state and including:
a first sub-state;
a second sub-state, the second sub-state being a composite sub-state and including:
a first sequential sub-state that includes at least two additional sequential sub-states; and a second sequential sub-state that includes at least two additional sequential sub-states, the second sequential sub-state and the first sequential sub-state being concurrent sub-states such that a data object may be in a state associated with the first sequential sub-state and a state associated with the second sequential sub-state concurrently; and a third sub-state; and a fifth permissible state;

creating a data object associated with the data object family;

assigning the data object to the first permissible state;

detecting a first event;

in response to detecting the first event, determining whether to transition the data object from the first permissible state to the second permissible state or transition the data object from the first permissible state to the third permissible state;

in response to determining to transition the data object from the first permissible state to the second permissible state:

transitioning the data object from the first permissible state to the second permissible state;

detecting a second event; and in response to detecting the second event, transitioning the data object from the second permissible state to the third permissible state;

in response to determining to transition the data subject from the first permissible state to the third permissible state:

transitioning the data object from the first permissible state to the third permissible state; and bypassing the second permissible state;

detecting a third event;

in response to response to detecting the third event, transitioning the data object from the third permissible state to the fourth permissible state by transitioning the data object to the first sub-state included in the fourth permissible state;

detecting a fourth event;

in response to detecting the fourth event, transitioning the data object from the first sub-state to the second sub-state by transitioning the data object to the first sequential sub-state and the second sequential sub-state such that the data object is concurrently in the first sequential sub-state and the second sequential sub-state;

detecting a fifth event;

in response to detecting the fifth event, transitioning the data object from the first sequential sub-state and maintaining the data object in the second sequential sub-state;

detecting a sixth event;

in response to detecting the sixth event;

transitioning the data object from the second sequential substrate such that the data object has exited both the first sequential sub-state and the second sequential sub-state; and transitioning the data object to the third sub-state included in the fourth permissible state;

detecting a seventh event; and in response to detecting the seventh event, transitioning the data object from the third sun-state included in the fourth permissible state to the fifth permissible state.

* * * * *